Sept. 11, 1956 C. E. KERR 2,762,274

CARTON ERECTING APPARATUS

Filed Dec. 31, 1948 22 Sheets-Sheet 1

INVENTOR
CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 2

INVENTOR
*CHARLES E. KERR*

BY Woodcock and Phelan
ATTORNEYS

Sept. 11, 1956 C. E. KERR 2,762,274

CARTON ERECTING APPARATUS

Filed Dec. 31, 1948 22 Sheets-Sheet 3

INVENTOR
CHARLES E. KERR

BY Woodcock and Phelan
ATTORNEYS

INVENTOR
CHARLES E. KERR
BY Woodcock and Phelan
ATTORNEYS

FIG. 6
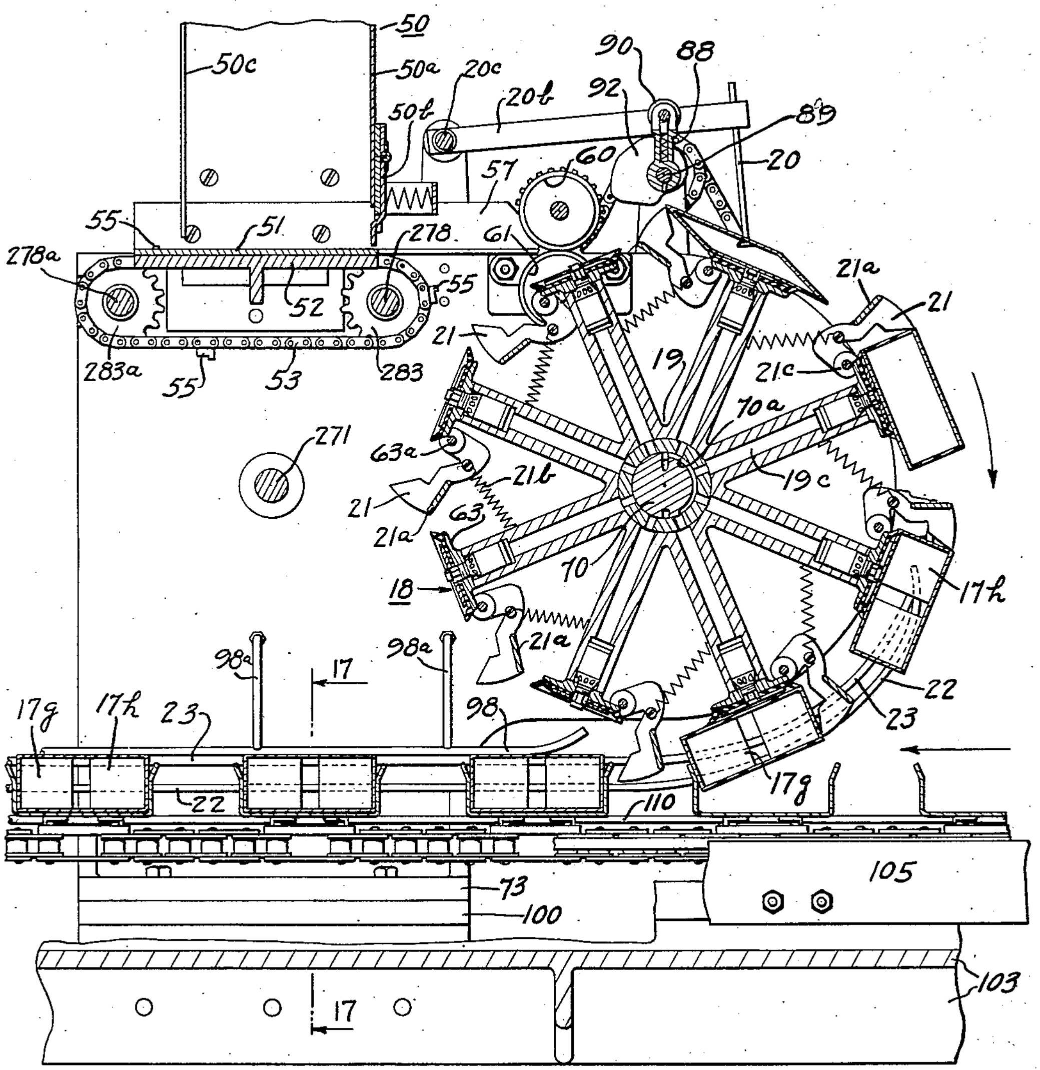
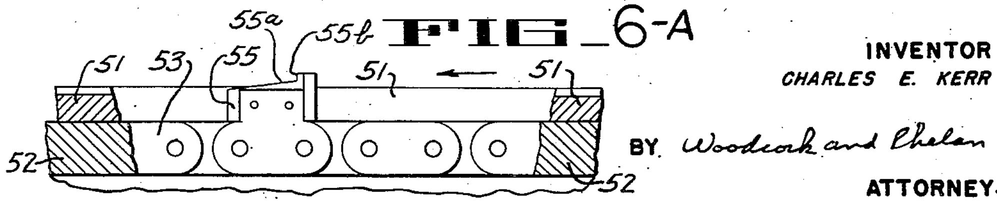
FIG. 6-A
INVENTOR
CHARLES E. KERR
BY Woodcock and Phelan
ATTORNEYS Sept. 11, 1956 C. E. KERR 2,762,274

CARTON ERECTING APPARATUS

Filed Dec. 31, 1948 22 Sheets-Sheet 6

INVENTOR
CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 7

INVENTOR
CHARLES E. KERR.

BY Woodcock and Phelan
ATTORNEYS

CARTON ERECTING APPARATUS

Filed Dec. 31, 1948 22 Sheets-Sheet 8

INVENTOR
CHARLES E. KERR
BY Woodcock and Phelan
ATTORNEYS

Sept. 11, 1956 C. E. KERR 2,762,274

CARTON ERECTING APPARATUS

Filed Dec. 31, 1948 22 Sheets-Sheet 9

INVENTOR
CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 10

INVENTOR
CHARLES E. KERR.

BY Woodcock and Phelan
ATTORNEYS

Sept. 11, 1956 C. E. KERR 2,762,274

CARTON ERECTING APPARATUS

Filed Dec. 31, 1948 22 Sheets-Sheet 11

INVENTOR
CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 12

INVENTOR
CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 13

INVENTOR
CHARLES E. KERR.

BY Woodcock and Phelan

ATTORNEYS

INVENTOR

CHARLES E. KERR

BY Woodcock and Phelan

ATTORNEYS

INVENTOR
CHARLES E. KERR.
BY Woodcock and Phelan
ATTORNEYS

Sept. 11, 1956 C. E. KERR 2,762,274

CARTON ERECTING APPARATUS

Filed Dec. 31, 1948 22 Sheets-Sheet 16

INVENTOR

CHARLES E. KERR

BY Woodcock and Phelan

ATTORNEYS

Sept. 11, 1956 C. E. KERR 2,762,274

CARTON ERECTING APPARATUS

Filed Dec. 31, 1948 22 Sheets-Sheet 17

INVENTOR
CHARLES E. KERR

BY Woodcock and Phelan

ATTORNEYS

INVENTOR
CHARLES E. KERR
BY Woodcock and Phelan
ATTORNEYS

Sept. 11, 1956 C. E. KERR 2,762,274

CARTON ERECTING APPARATUS

Filed Dec. 31, 1948 22 Sheets-Sheet 19

INVENTOR
CHARLES E. KERR

BY Woodcock and Phelan
ATTORNEYS

Sept. 11, 1956 C. E. KERR 2,762,274

CARTON ERECTING APPARATUS

Filed Dec. 31, 1948 22 Sheets-Sheet 20

INVENTOR
CHARLES E. KERR

BY Woodcock and Phelan
ATTORNEYS

Sept. 11, 1956 C. E. KERR 2,762,274

CARTON ERECTING APPARATUS

Filed Dec. 31, 1948 22 Sheets-Sheet 21

INVENTOR
CHARLES E. KERR.

BY Woodcock and Phelan
ATTORNEYS

INVENTOR.
CHARLES E. KERR
BY Woodcock and Phelan
ATTORNEYS

United States Patent Office 2,762,274

Patented Sept. 11, 1956

2,762,274

CARTON ERECTING APPARATUS

Charles E. Kerr, Hoopeston, Ill., assignor to Food Machinery and Chemical Corporation, San Jose, Calif., a corporation of Delaware Application December 31, 1948, Serial No. 68,484

31 Claims. (Cl. 93—53)

This invention relates to systems for feeding, filling and sealing cartons and has for an object the provision of an efficient reliable system resulting from improved components and their new and novel cooperation one with the other.

More particularly, the invention relates to systems in which cartons from their time of removal from a stack or magazine are maintained in continuous motion during the successive steps of unfolding, closing and gluing the end flaps at one end, filling, closing and gluing the end flaps at the other end, and transporting the cartons to a discharge station while the closed ends are under pressure during the setting of the glue.

In accordance with one aspect of the invention, the removal of cartons from a magazine is effected by a continuously moving endless chain arrangement which transfers them in turn to a continuously rotating turret or wheel having carton-opening mechanisms carried thereby which are effective to open each carton without interruption of its movement toward, and before its transfer to, an endless conveyor chain whose path of movement lies along that of said wheel.

More particularly, each carton upon removal from the magazine engages a suction head having a carton bending axis located by a downwardly inclined supporting surface along its leading end. Suction is applied with each carton so registered on a suction head as to make effective the atmospheric pressure to bend the leading end of the carton downwardly with a score line located at said bending axis. The initial bending of the carton in the unfolding or carton-erecting direction makes highly effective a carton-erecting tool carried by each head and movable against the trailing edge of each carton to swing it about its preformed score lines to a fully erect or unfolded position. Preferably the carton is moved beyond its unfolded position to "break" the score lines; that is, to limber up the blank so that it will thereafter remain in fully opened position after release by the suction head.

In further progress around the suction wheel the end flaps at one end of the carton are folded to closed position. Each carton, as it arrives near the bottom of the suction wheel, registers with an upwardly directed U-shaped pocket of a conveyor movable in timed relation therewith. Each carton is then carried by its associated pocket with the side portions in opened position preparatory to the application of glue to the lower flap. The under surface of the lower flap is fully coated with glue, whereas on the upper surface no glue is applied to the central portion which will be exposed to the interior of the carton.

After application of the glue the flap is closed, the upper flap moved to closed position against it, and pressure is maintained on the glued surface by a pressure belt traveling at the same speed as the conveyor. After travel for sufficient time for partial setting of the glue, each conveyor pocket is in turn rotated along the line of travel to move each carton to an upright position. Each channel pocket has a depth less than that of the carton so that the carton itself may be guided by rails for passage through a filling machine and for carton-actuation of a filling device.

The filling device is actuated by engagement of an exposed side of each carton with a pressure foot which brings into operation mechanism for opening a filler pocket for the introduction into each carton of a measured amount of material. In the absence of a carton in a conveyor pocket, the pressure foot is not actuated and the filling pocket is not opened, an arrangement which, it will be appreciated, is particularly desirable.

After filling, folding tools associated with the conveyor first turn in the end flaps. Glue is applied to one of the side flaps in manner described for the opposite end of the carton. The side flaps are then folded into position and the assembly as a whole maintained under pressure for final setting of the glue.

With the foregoing introductory explanation of the invention, it is believed that a more comprehensive understanding of the invention, together with its objects and advantages may best be gained by reference to the system and mechanism as a whole and the manner in which it operates. Accordingly, further objects and advantages will be presented in the following detailed description taken in conjunction with the accompanying drawings in which:

Fig. 1 is a plan view of the apparatus as a whole;

Fig. 1–A is a perspective view of a carton illustrating the panels and closing flaps thereof;

Fig. 2 is a side elevation of the apparatus of Fig. 1 taken along the line 2—2;

Fig. 2–A is a fractional perspective view of the pocket-turning guide rod as viewed from 2–A and 2–A of Fig. 1;

Fig. 6 is a reduced vertical section taken along the line 6—6 of Fig. 5 but with the erecting wheel in an angular position differing from the position shown in Fig. 5;

Figure 1:
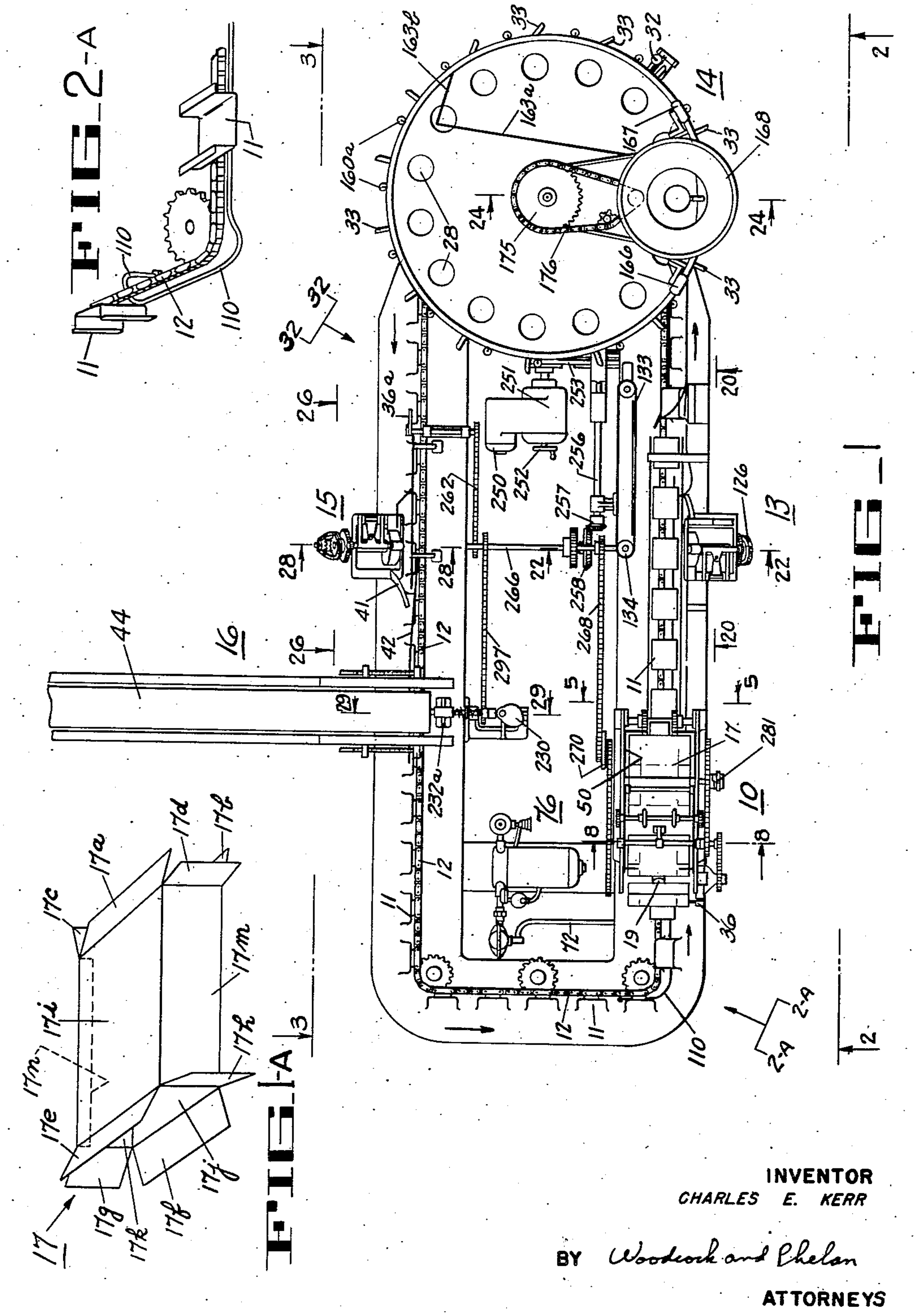
Figure 5:
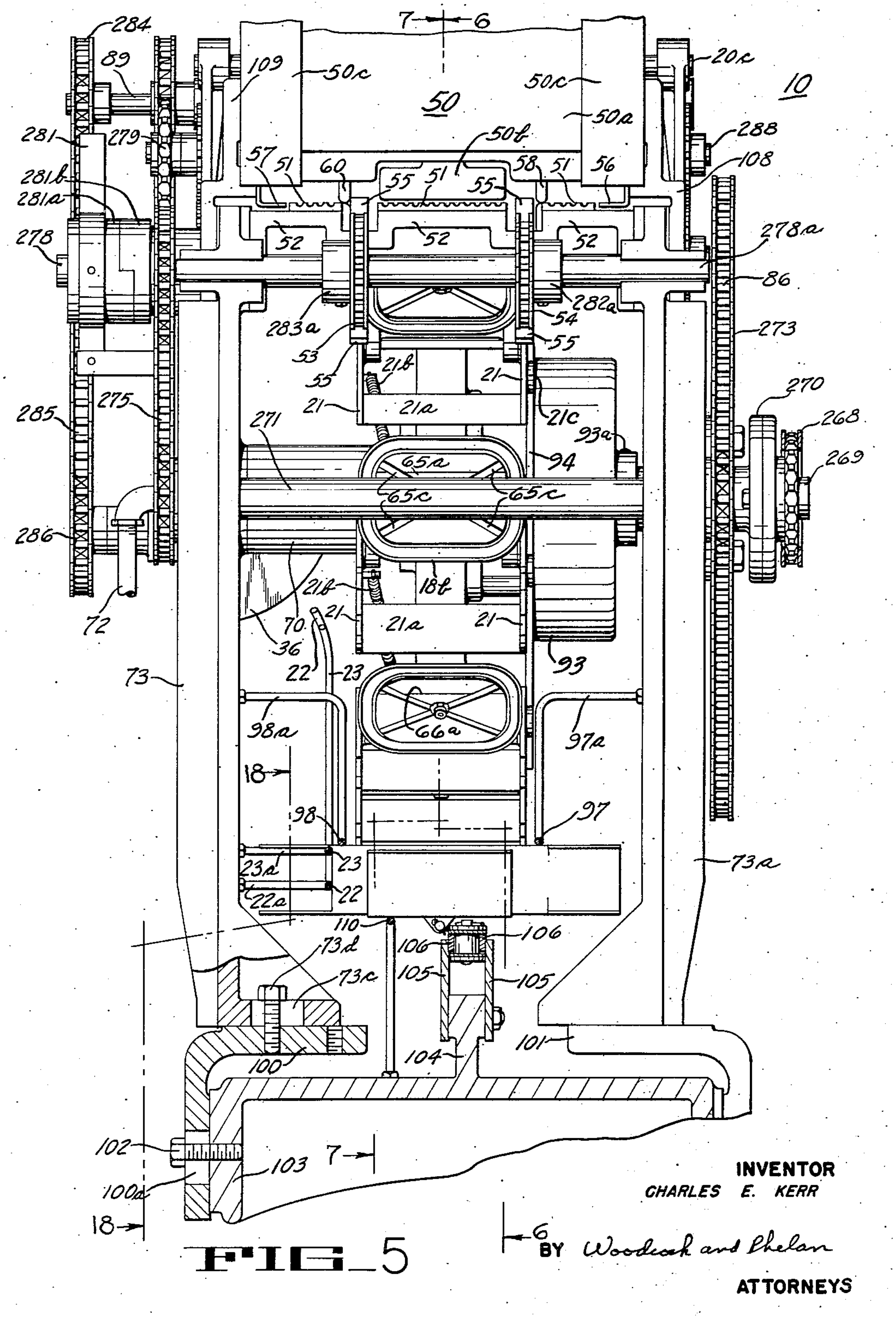
Fig. 5 is an enlarged elevation of the carton-feeding mechanism taken along the line 5—5 of Fig. 1.
Figure 7:
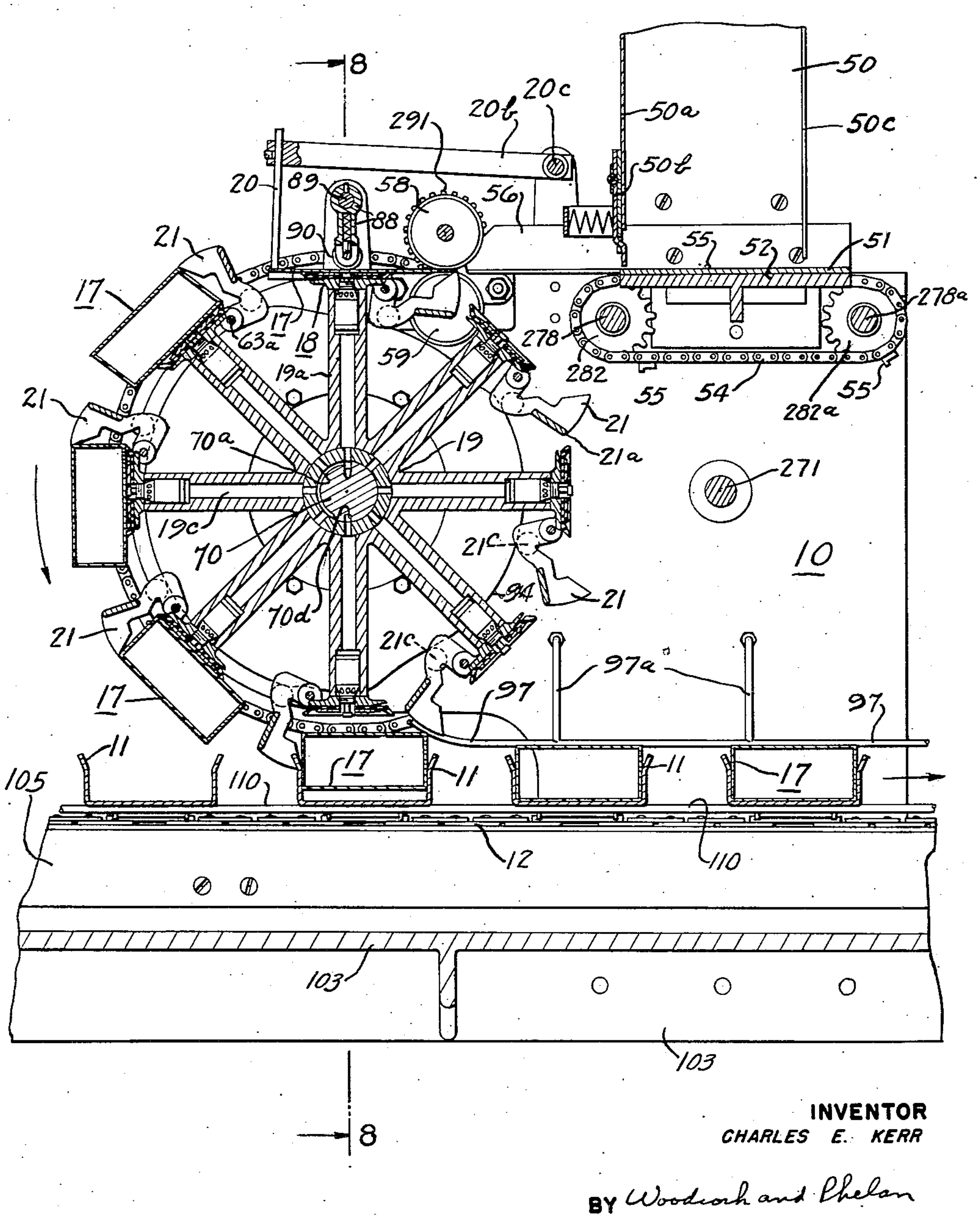
Figure 8:
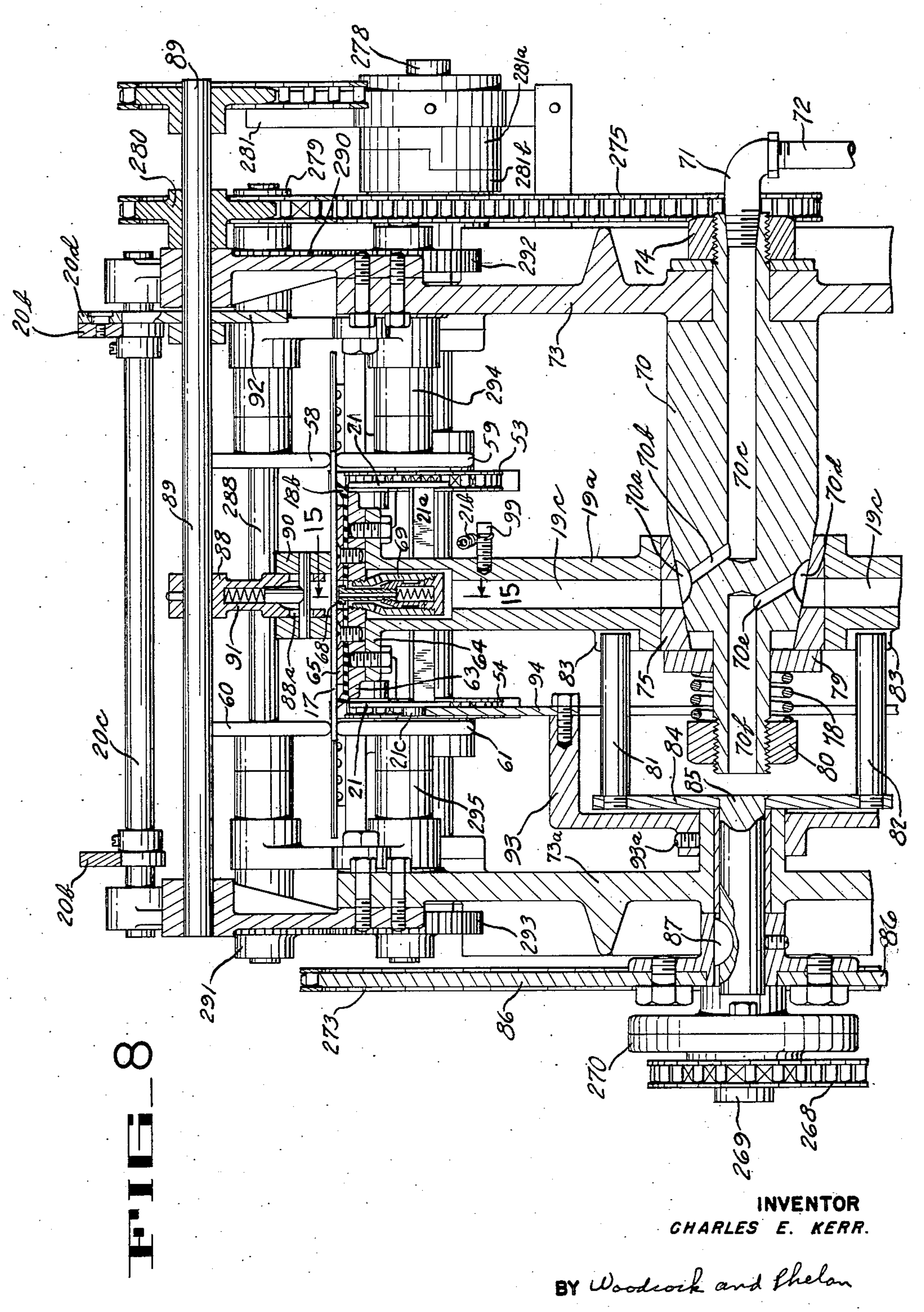
Figure 16:
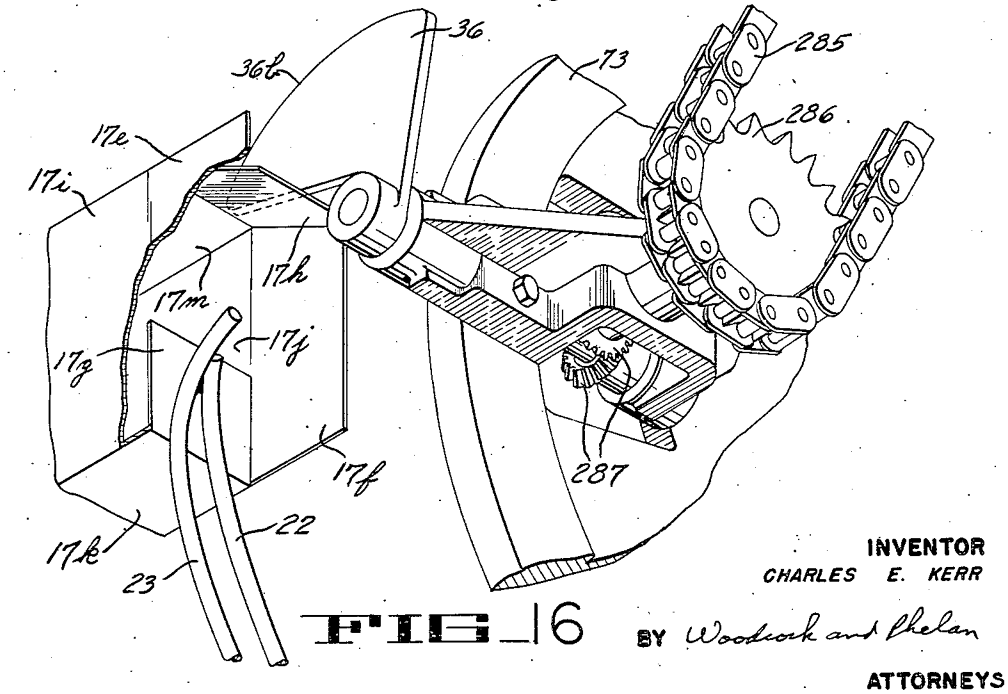
Figures 13, 14, 15:
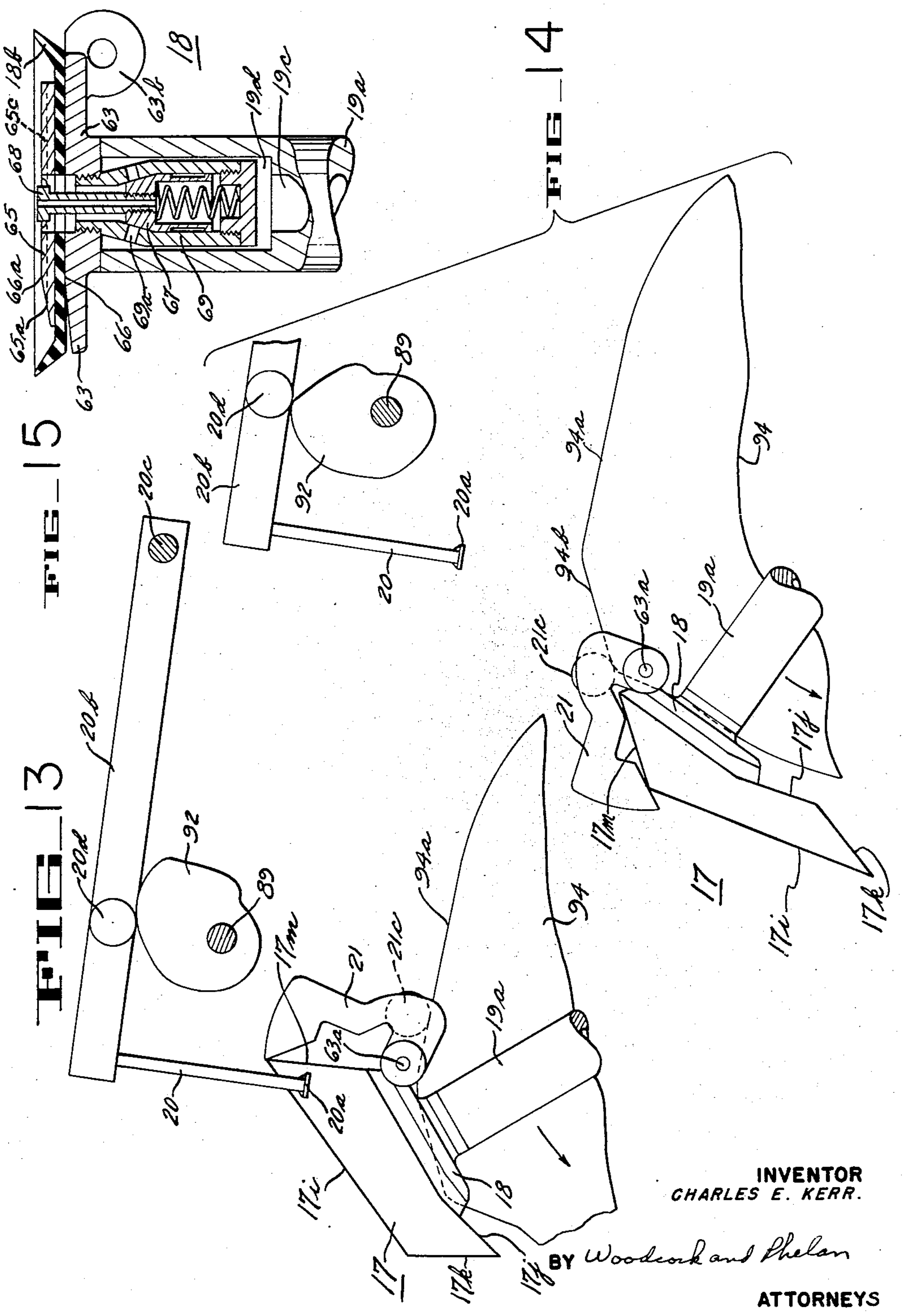
Figures 17, 20:
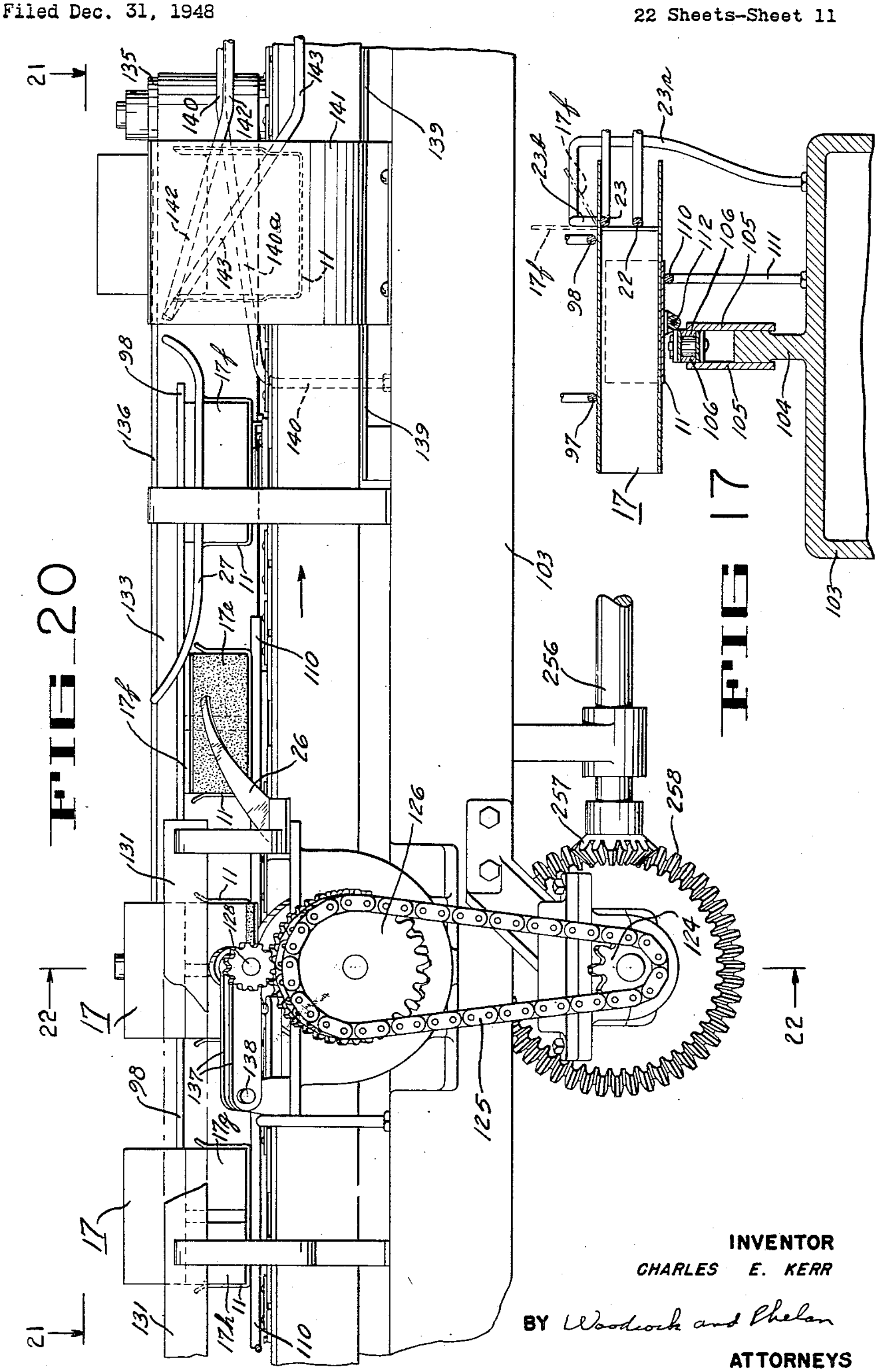
Figure 18:
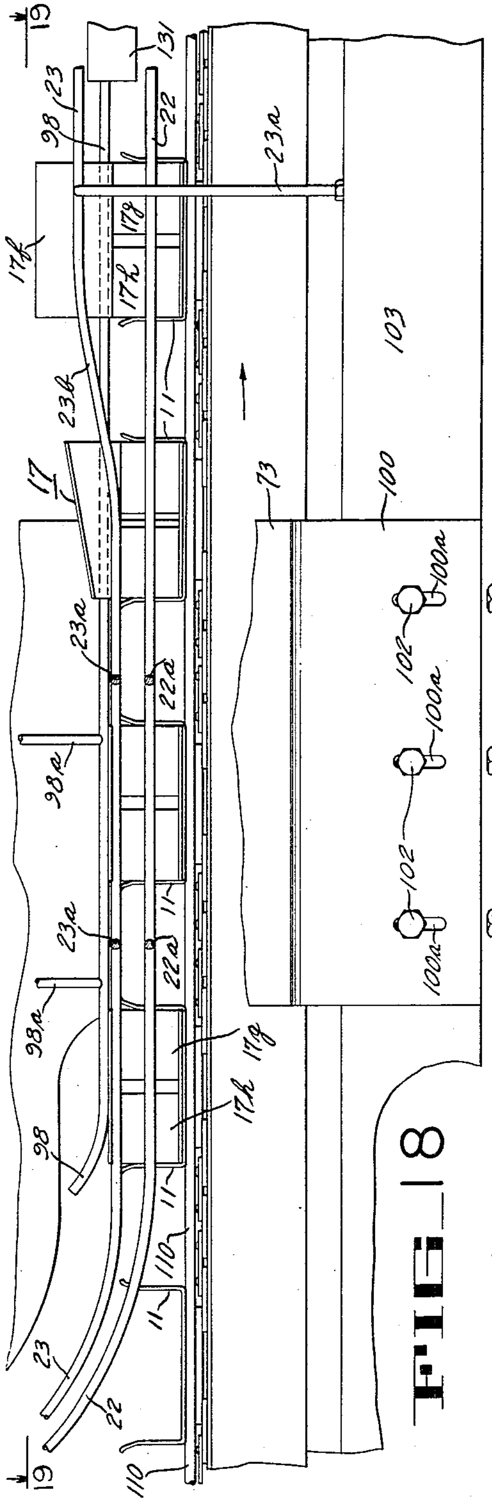
Figure 19:
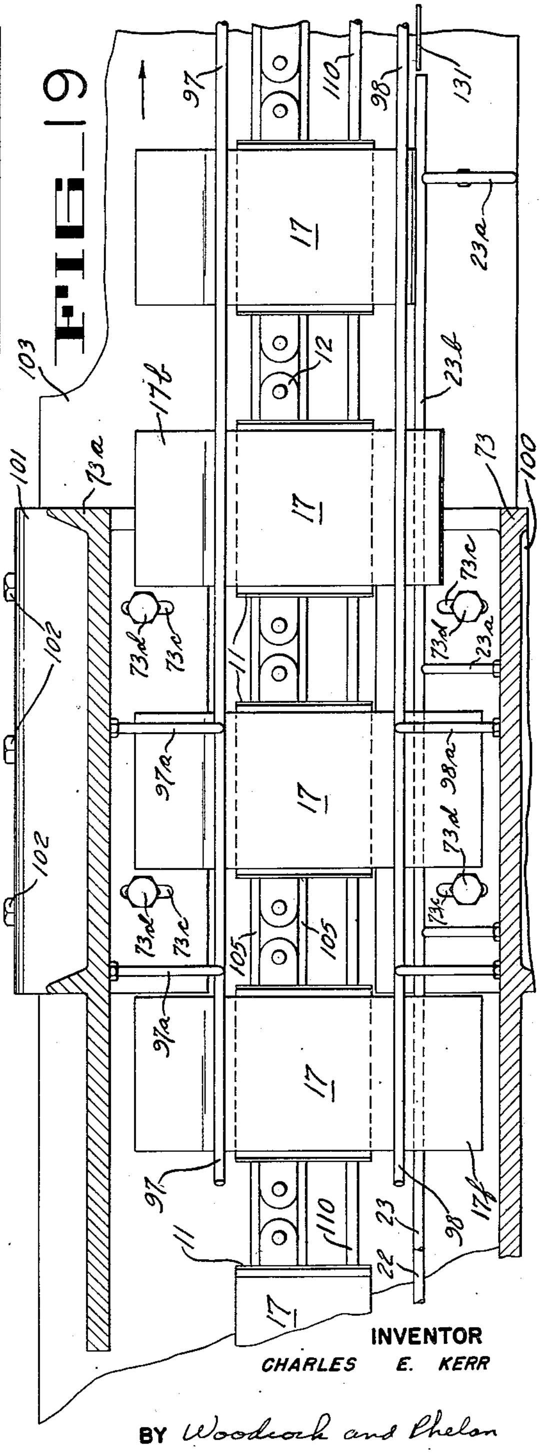
Figure 21:
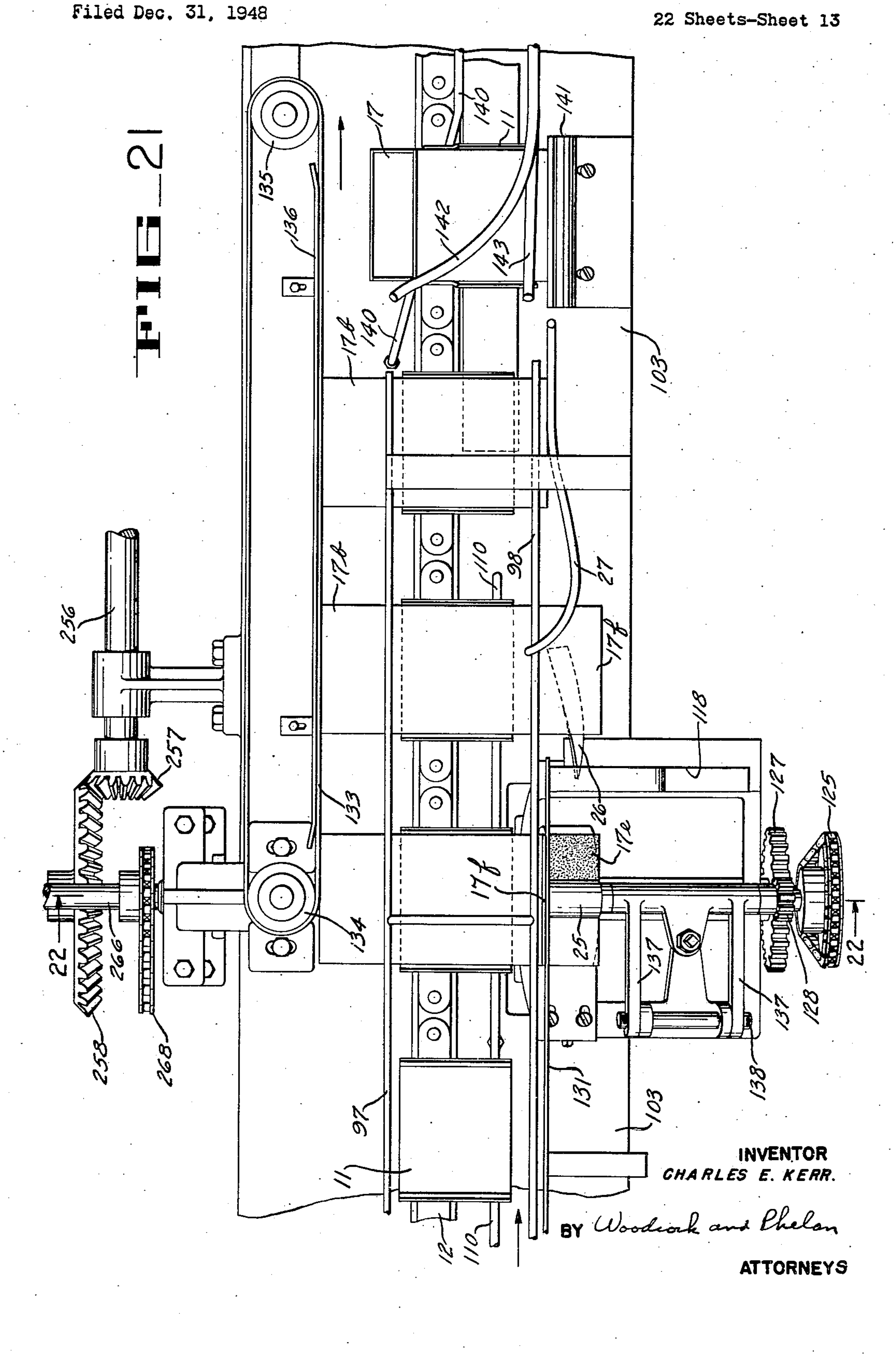
Figure 22:
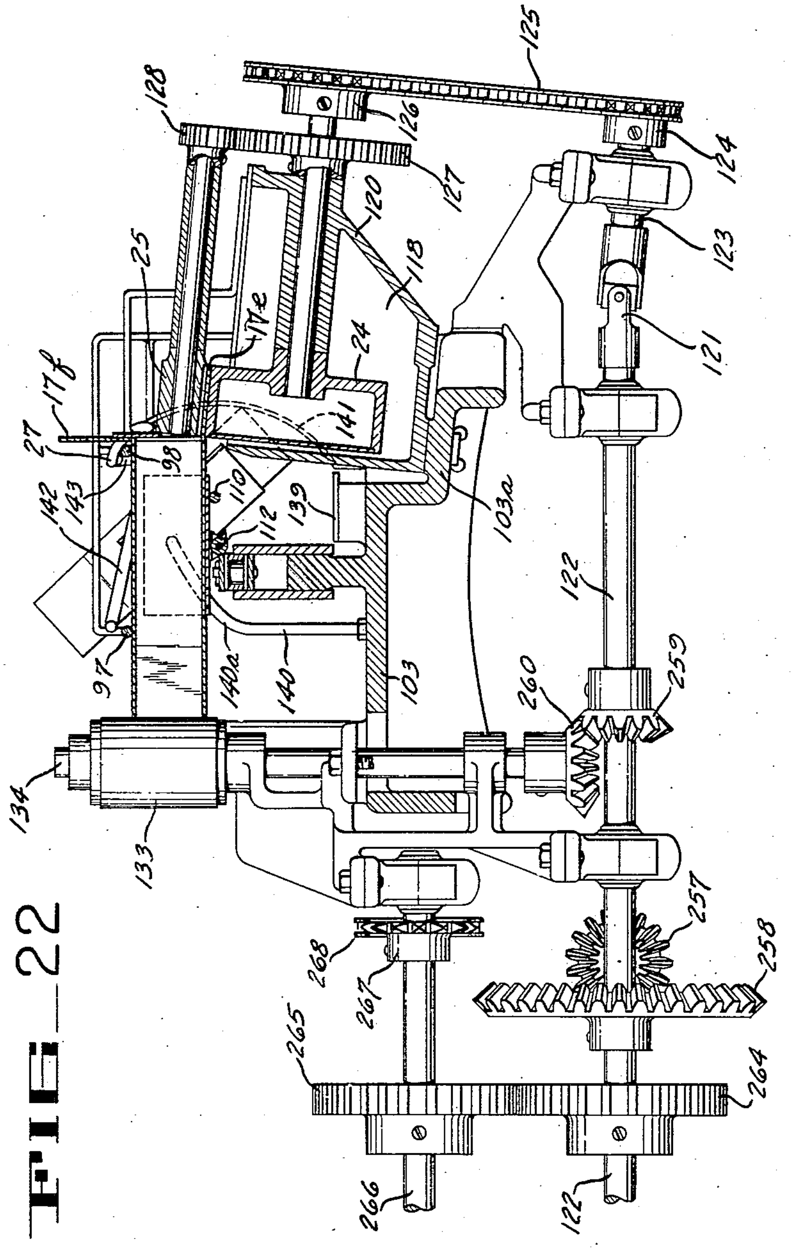
Figures 23, 31:
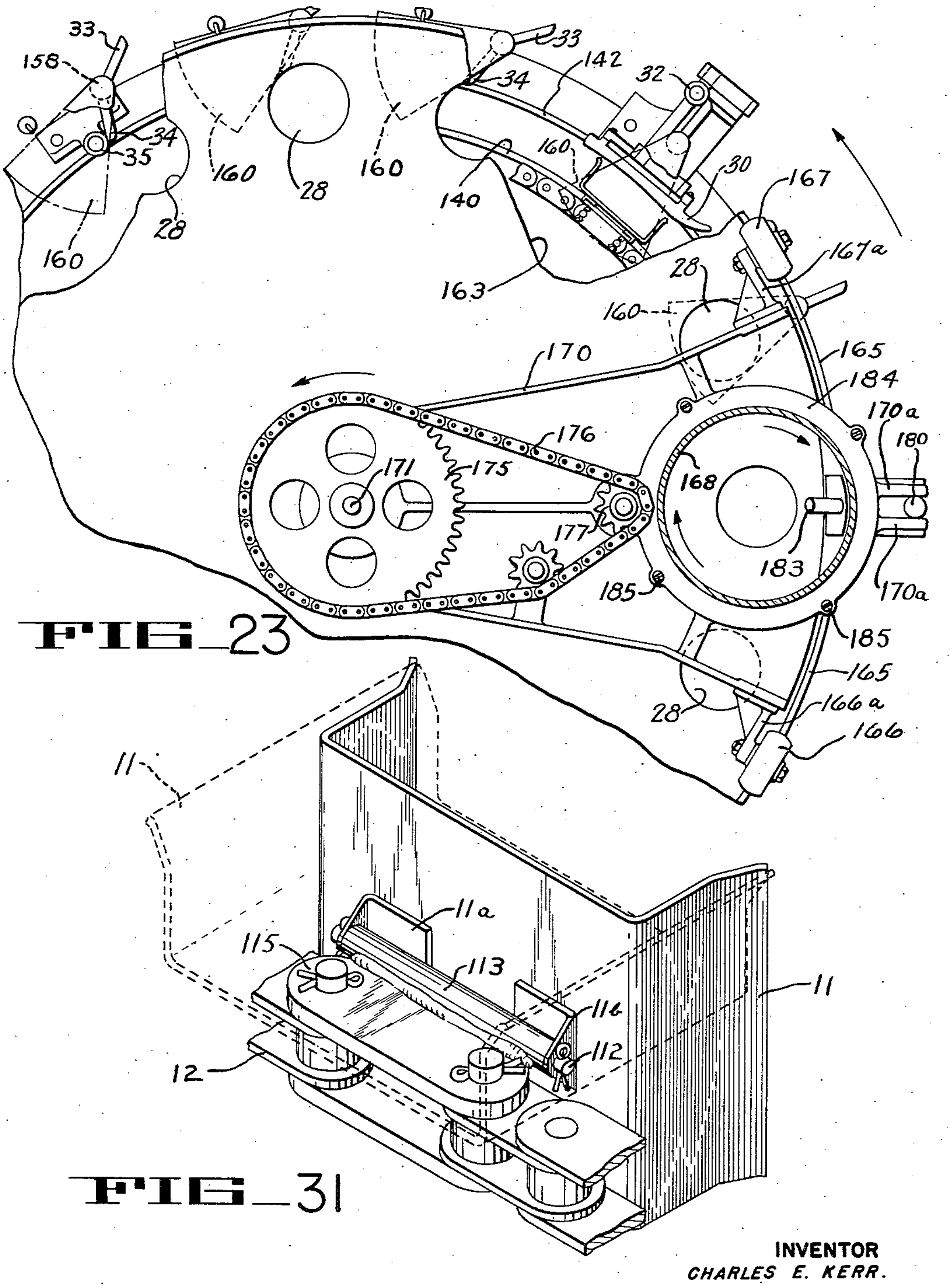
Figure 24:
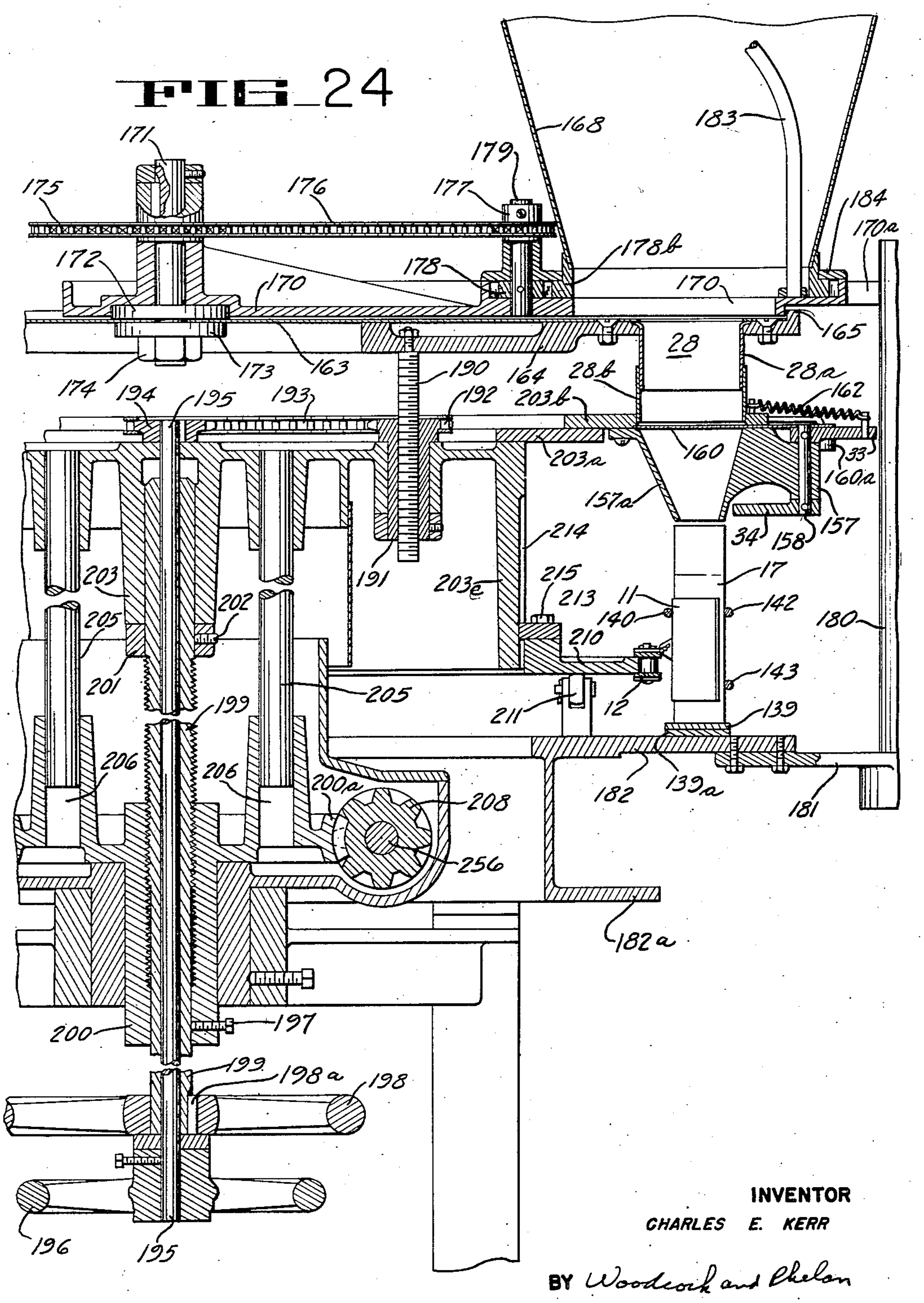
Figure 25:
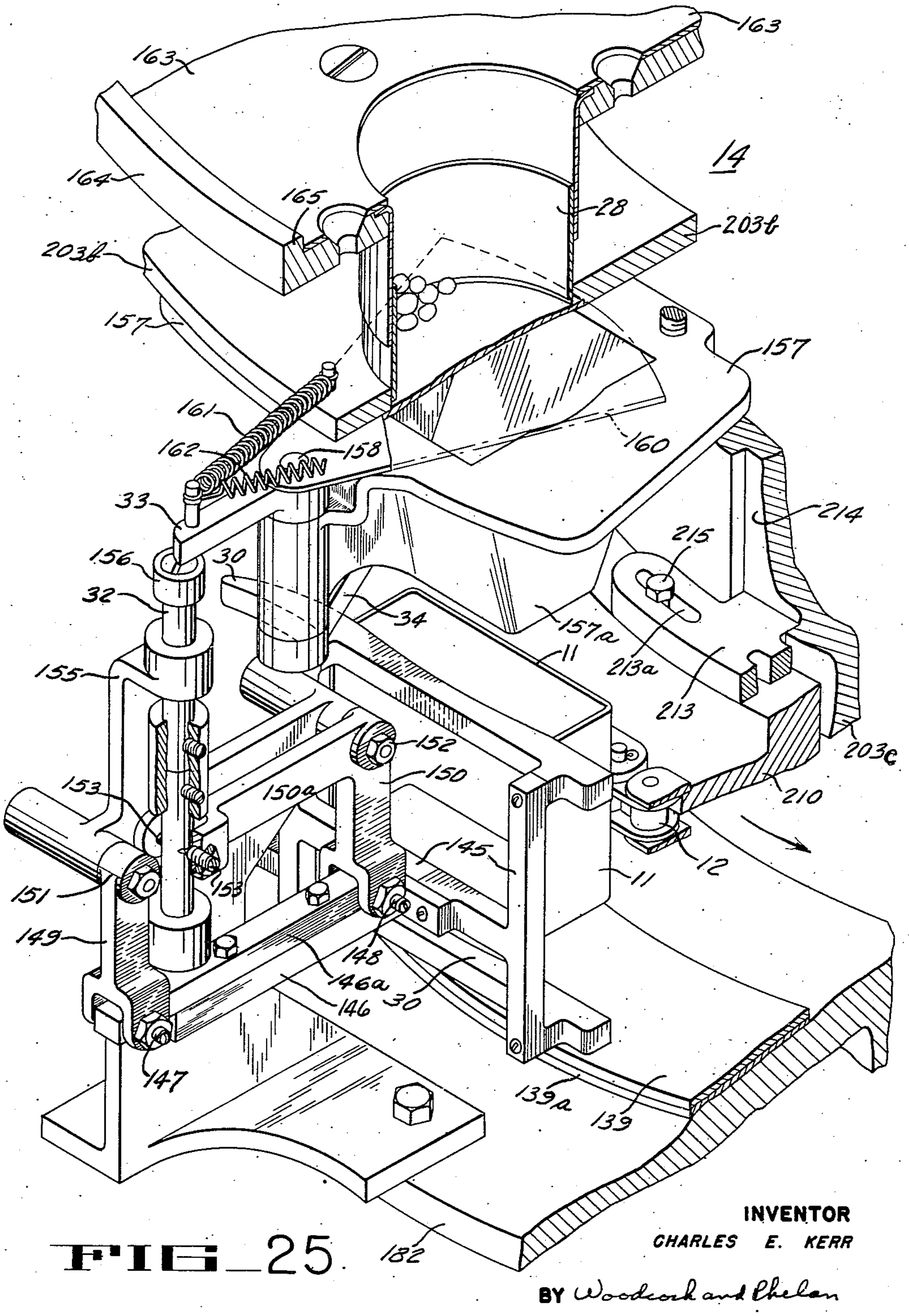
Figure 26:
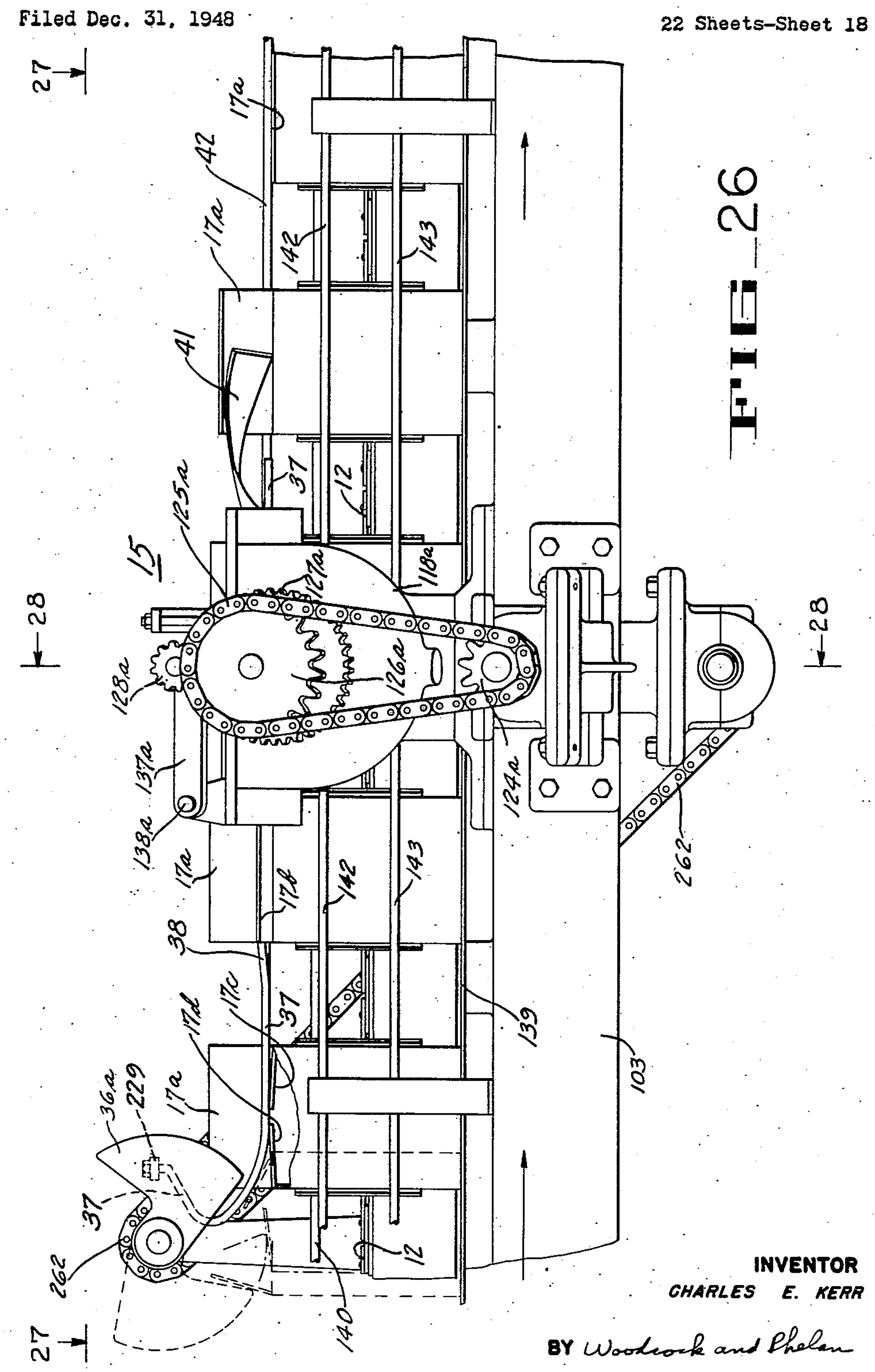
Figure 27:
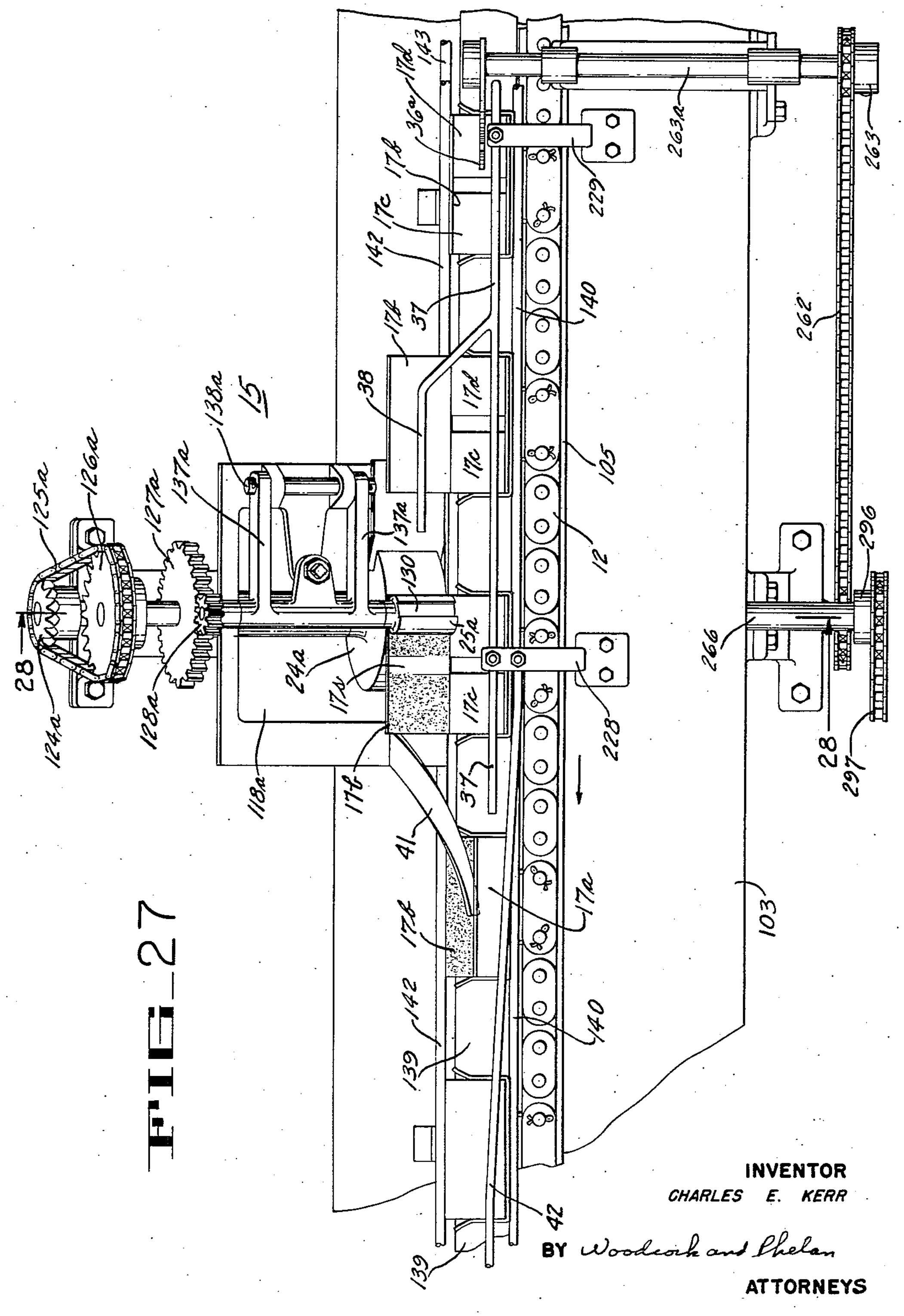
Figure 28:
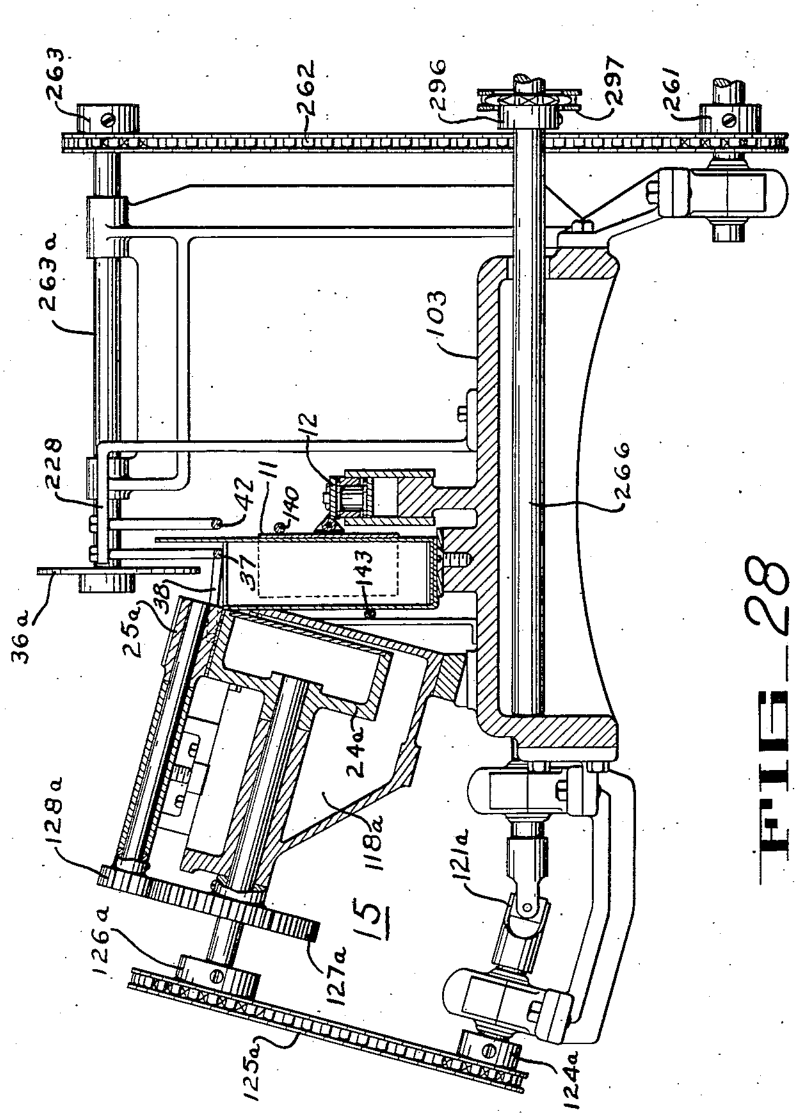
Figures 29, 30:
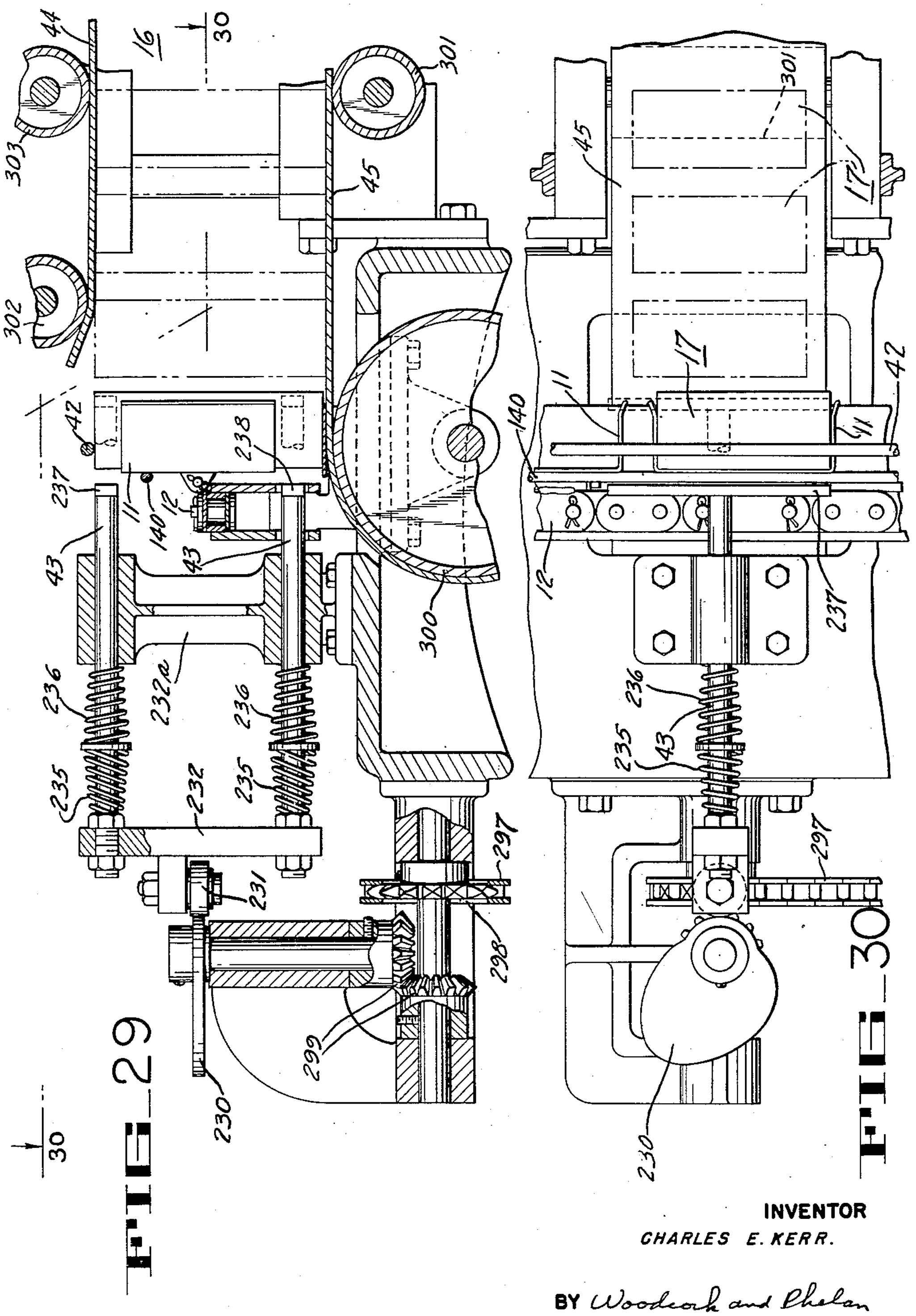
Figure 32:
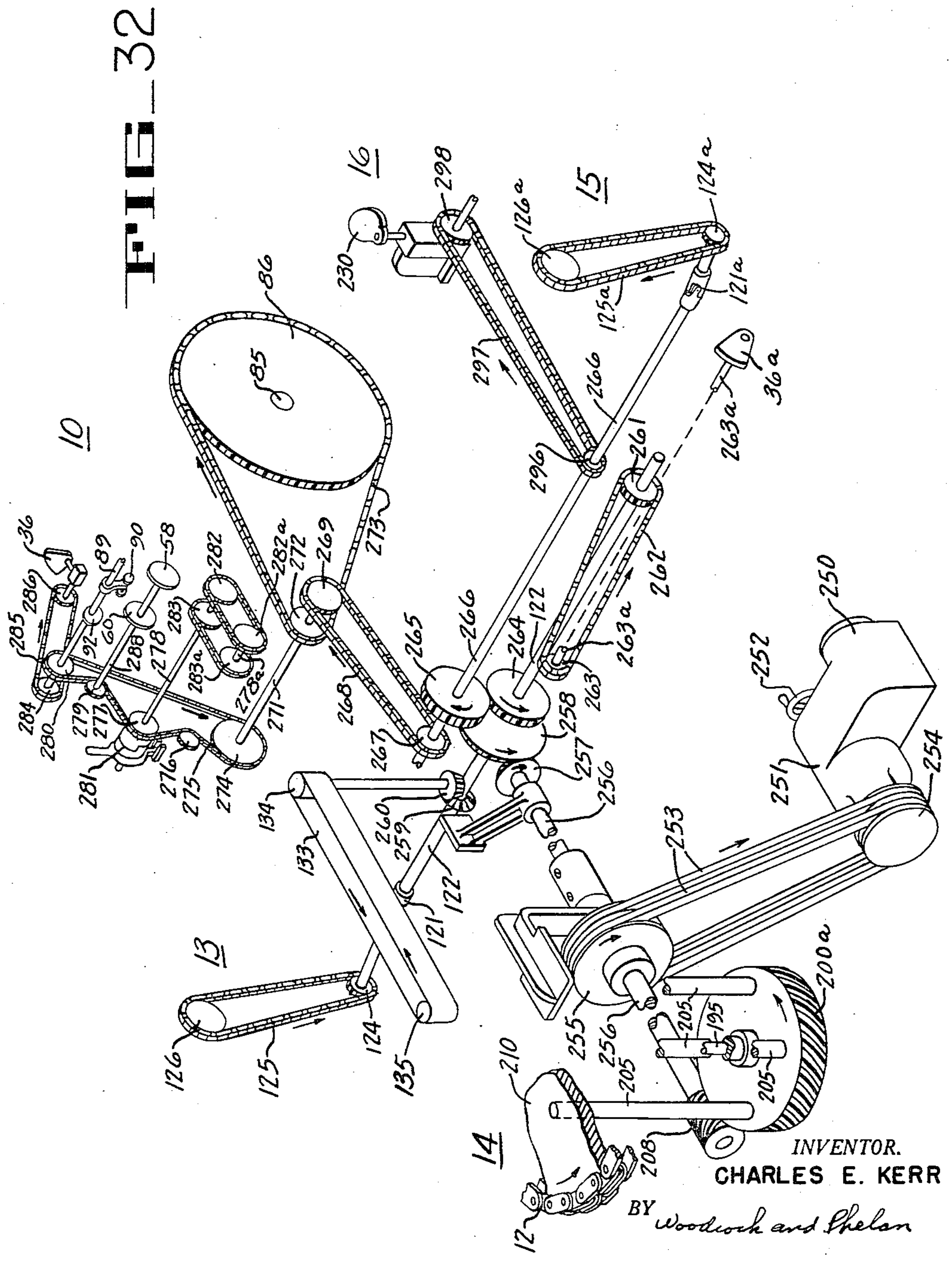

Fig. 6–A is an enlarged sectional view of a feeding element of the feed chain of Fig. 6;

Fig. 7 is a reduced vertical section taken along the line 7—7 of Fig. 5;

Fig. 8 is a transverse section of a portion of the carton-feeding mechanism taken along the line 8—8 of Figs. 1 and 7;

Figs. 9–14 are enlarged fractional views illustrating a part of the carton-erecting mechanism with the parts in different positions to illustrate the several steps performed in the unfolding or erection of a carton;

Fig. 15 is an enlarged sectional view of one spoke of the suction wheel and the suction head thereof;

Fig. 16 (sheet 8) is an enlarged perspective view looking upwardly into the mechanism of Fig. 1 in the vicinity of reference character 36;

Fig. 17 is an enlarged sectional view taken along the line 17—17 of Fig. 6;

Fig. 18 is a sectional view taken along the line 18—18 of Fig. 5 showing a portion of the conveyor chain and guide rods associated therewith in the vicinity of the carton-erecting mechanism;

Fig. 19 is a plan view of Fig. 18;

Fig. 20 (Sheet 11) is an enlarged side elevation of that portion of the apparatus including the first gluing station and the associated structure as shown by the line 20—20 of Fig. 1;

Fig. 21 is a plan view of Fig. 20;

Fig. 22 is a section of the first gluing station taken along the line 22—22 of Figs. 1 and 20;

Fig. 23 is a fractional plan view of the filling mechanism with parts cut away;

Fig. 24 is an enlarged section of the filling mechanism taken along the line 24—24 of Fig. 1;

Fig. 25 is a fractional perspective view, partly in section, of that part of the filling mechanism which includes a no-carton, no-fill mechanism;

Fig. 26 is an enlarged rear side elevation of the apparatus of Fig. 1 taken along the line 26—26 thereof in the vicinity of the second gluing station;

Fig. 27 is a plan view of Fig. 26;

Fig. 28 is a section of the second gluing station taken along the line 28—28 of Figs. 1 and 27;

Fig. 29 is an enlarged section of a part of the discharge mechanism and a part of the compression unit taken along the line 29—29 of Fig. 1;

Fig. 30 is a plan view of Fig. 29;

Fig. 31 (Sheet 15) is an enlarged perspective view of one of the conveyor pockets showing the pivotal mounting thereof on the conveyor chain; and Fig. 32 is a diagrammatic perspective view, as seen from 32—32 of Fig. 1, of the drive mechanism of the machine illustrating the manner in which the several component parts are driven in timed relation one with the other.

In systems for feeding, filling and sealing cartons a number of preliminary carton-forming operations must be performed in timed relation one to the other, because the cartons as received are folded and flat with preformed score lines and with pre-cut end flaps and side flaps. The cartons must be unfolded, one end closed and glued, the carton filled and then the opposite end closed and glued.

It has become increasingly important to increase the speed and reliability with which continuously operating systems of the foregoing type operate, not only from the standpoint of decreased cost per package, but also because of the need to package frozen food as quickly as possible after removal from bulk freezing lockers to minimize thawing before return of the packaged products to the freezing lockers. With the machine herein disclosed and described, substantially increased output, speed and reliability have been attained.

Referring now to the drawings, Fig. 1 is a plan view of the system as a whole in which the principal parts will be identified. The carton-unfolding and feeding mechanism 10 is arranged to unfold the flattened cartons in succession fed from a stack or magazine supply thereof and delivers them to and in timed relation with pockets 11 of a conveyor 12 synchronously driven with the carton-feeding mechanism 10. An adhesive-applying mechanism 13 applies a suitable adhesive or glue to a flap at one end of the carton, and after the closure of that end, the cartons are moved to a filling machine 14. After each carton is filled it is transported by the same conveyor 12 to a second adhesive-applying mechanism 15. After application of the adhesive or glue, the remaining open end of the carton is closed and is discharged from the conveyor 12 into a compression unit 16, the time of travel through the compression unit being adequate for the setting of the glue. In Fig. 1, the cartons 17 may be seen in the magazine 50 and on the suction wheel or turret 19 but they have not been shown in the conveyor pockets 11.

Fig. 1–A is a perspective view of a typical carton in the fully opened position with the flaps shown bent in such manner to expose all panels and flaps to view. More particularly, the side flaps **17*a* and 17*b* extend outwardly from the central or side panels 17*i* and 17*j*, while the end flaps 17*c* and 17*d* extend outwardly from the end panels 17*k* and 17*m*. Similarly, at the other end of the box, the side flaps 17*e* and 17*f* extend outwardly from the side panels, while the end flaps 17*g* and 17*h* extend outwardly from the end panels 17*k* and 17*m*. The pivotal axis of each flap is, of course, predetermined by score lines. Similarly, there are score lines fixing the pivotal axes for rotation of each carton from the folded to the unfolded position. The cartons themselves are die-cut from flat cardboard which may be coated with a water-repellent material. When die-cut, the score lines and the slits between the flaps are simultaneously made. The flat sheets are then folded and glued together as by an extension 17*n* from the panel 17*i* adhesively secured to the end panel 17*k* as indicated by the broken line. As already stated, the cartons are received in stacks or bundles in which each carton lies flat. The end panel 17*k* lies flat against the lower side panel 17*j*, and the side panel 17*i* lies flat upon the trailing end panel 17*m***. At that time the cartons are stiff, since there has not as yet been any bending of the flaps about their respective score lines.

Figure 4:
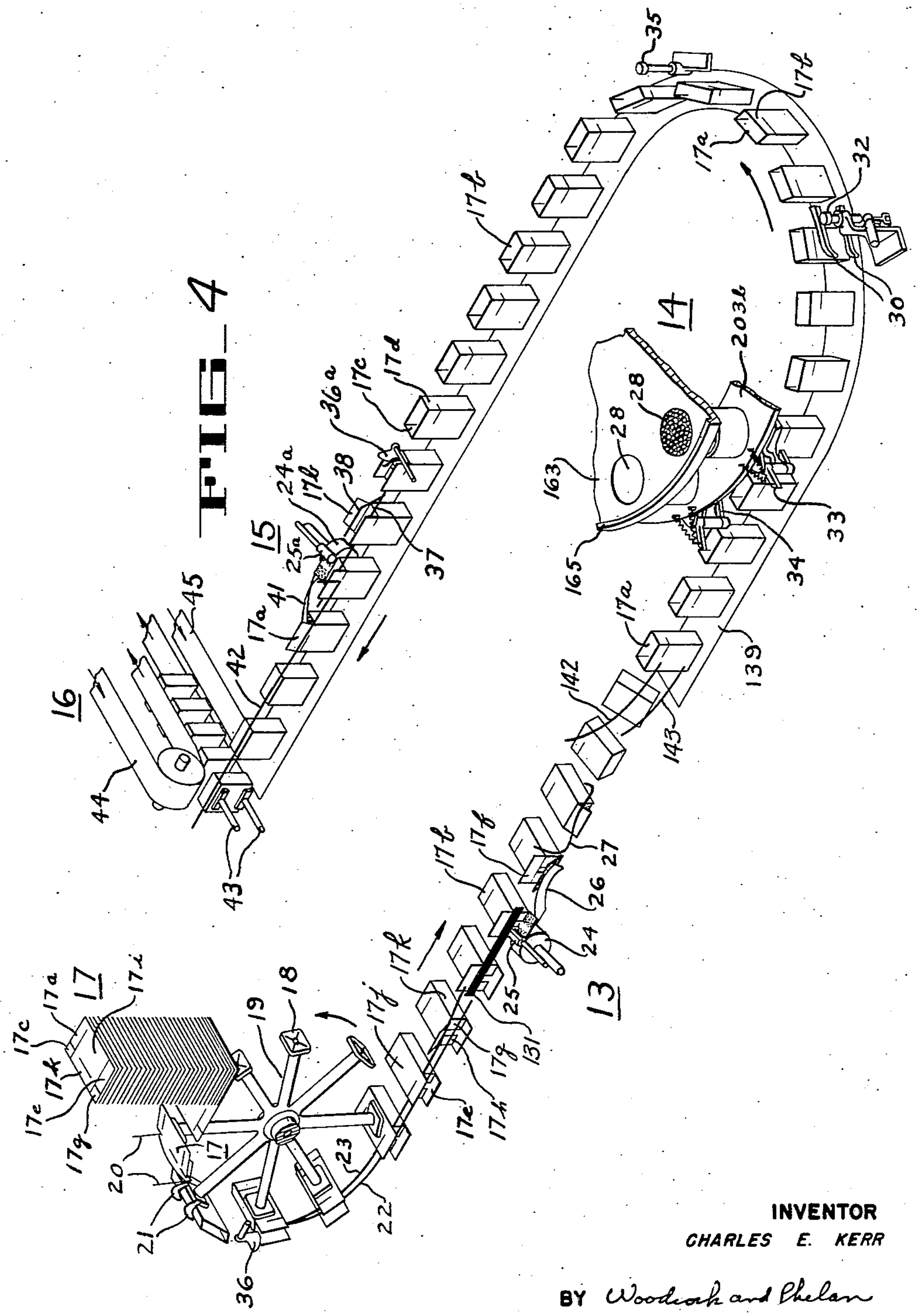
Fig. 4 is a perspective flow diagram schematically illustrating a number of the operations performed by the apparatus of Fig. 1 in setting up, filling and closing the cartons.

Referring now to Fig. 4, the nature of the operations performed will be explained. A detailed discussion of how the mechanism performs each operation will be later set forth. In Fig. 4 the folded cartons 17 are disposed in a suitable magazine, the cartons appearing in Fig. 4 in a vertical stack. The cartons are delivered in succession from the bottom of the stack into registered position with one of the suction heads 18 located at the extremity of each of the spoke-like elements of a suction wheel 19. As each carton comes into registered position above a head 18, suction is applied to hold it in place thereon. After application of suction, the inturned carton-engaging ends of elements 20 are moved downwardly against the end flaps **17*c* and 17*g* of the leading end of a carton 17, the wheel 19 being shown as rotating in a counter-clockwise direction. The inturned ends of the elements 20 are effective to depress the leading end flaps 17*c* and 17*g* relative to the adjacent side flaps 17*a* and 17*e* of the carton. Forward movement of the carton with each suction head moves the side flaps 17*a* and 17*e* over and above the inturned ends of elements 20. Downward movement of carton 17 and upward movement of elements 20 apply carton-opening forces to the carton 17. As this occurs, carton-opening arms 21 carried by the suction wheel 19 press against the trailing folded edge of the carton 17 to initiate its movement to the unfolded position. These arms 21** may be actuated in any suitable manner as by a stationary cam, and the period during which the arms move the carton to unfolded position may be selected as something less than that required for movement of a suction head through approximately 180°, that is, from one vertical position to the other.

During this transit time of the suction head, the end flaps **17*g* and 17*h* are folded inwardly. The flap 17*g* is folded by the curved ends of elements 22 and 23 (Fig. 16), while the flap 17*h* is folded by a flap-turning element 36. Both folded flaps slide behind elements 22 and 23 which are thereafter effective to hold them in closed position. The unfolded boxes are delivered to the pockets 11 (not shown in Fig. 4) and are transported to the gluing mechanism 13. Each lower side panel 17*e* is bent downwardly a slight amount from the horizontal by engagement with the downwardly inclined rolls 24 and 25 of mechanism 13. Such inclination permits the rolls to apply adhesive close to the score line of flaps 17*e* and yet provides clearance so the upper roll 25 will not strike the leading end panel 17*k*. The upper roll 25 has a slot lengthwise thereof, of width corresponding with the distance between the two end flaps, to provide for skip-gluing. In other words, the upper roll 25 does not apply adhesive to that portion of the side flap 17*e*** which is between the end flaps and which is exposed to the contents of the carton. By applying the adhesive to both faces of the flap 17*e*, the gluing operation is simplified, and yet firm adhesive bonds are secured with each of the other flaps.

As the cartons are moved from the gluing mechanism 13 the lower flap is moved upwardly by the knife-edge of a flap-closing element 26 into adhesive engagement with the inturned end flaps. The upper side flap 17*f* is then rotated downwardly by a flap-guiding element 27 into bonding relation with the coated surface of the lower flap. Preferably the cartons are arranged to move for a predetermined distance while pressure is applied to the closed end of the carton to give the adhesive time partially to set.

During the foregoing preliminary steps, the cartons have been horizontally disposed. After closure of one end of each carton, it is turned to a vertical position preparatory to filling by the filling machine 14. The filling machine includes a series of measuring pockets 28 rotatable in timed relation with the conveyor and the cartons carried thereby. As each carton in turn arrives in registered position below a measuring pocket 28 it is arranged to engage a carton-detecting shoe 30 which, by reason of displacement thereof, moves a tripping pin 32 into the path of a gate-opening element 33 carried with a rotating element of the filling machine 14. The gate of the pocket 28 is thereby opened and its contents discharged into the carton disposed therebeneath. After adequate time for discharge into a carton of the contents of a pocket, a gate-closing element 34 engages a stationary abutment 35 to close the gate preparatory to the delivery of a further measured quantity of material into that pocket. In the absence of a carton from registration with a measuring pocket 28, the no-carton, no-fill mechanism is not operated, that is, the shoe 30 is not actuated to open the gate thereof. The gate of each filling pocket 28 is only opened when there is a carton in registered position below it.

After leaving the filling machine, the end flaps 17*c* and 17*d* of each filled carton are folded into closed position by a stationary flap-turning element 37 and a rotatable flap-turning element 36*a*. The side flap 17*b* is then bent outwardly from the vertical position, but not entirely to a horizontal position, by a flap-engaging element 38 for passage between glue-applying rolls 24*a* and 25*a* of construction identical with the rolls 24 and 25 except that the rolls 24*a* and 25*a* are disposed at the same angle as the flap 17*b*, the inclination of both providing clearance away from the vertical adjacent side of the box. The knife-edge of a flap-closing element 41 engages the adhesively coated flap, turns it to closed position, and thereafter a flap-engaging element 42 turns the other flap 17*a* to closed position. The box with both ends adhesively closed is then pushed from the conveyor by plungers 43 into the compression unit 16 formed by two conveyor belts 44 and 45 which maintain the tops under compression until the glue or adhesive has had time to set.

With the above understanding of the system as a whole, reference will now be made in turn to each component mechanism and the manner in which it performs its designated operations.

*The carton unfolding and feeding mechanism*

Referring now to Figs. 5–15, the carton unfolding and feeding mechanism 10 has been shown in one form as comprising a vertically disposed magazine 50 arranged to receive a stack of folded cartons. The lower end of the magazine 50 has across the bottom thereof a plate 51 on which the lowermost carton rests. As best shown in Fig. 5, the plate 51 has a plurality of corrugations formed in its upper surface to minimize friction during the sliding of a carton therefrom. The plate is secured to a frame casting 52 having elongated slots in which are disposed a pair of feeder chains 53 and 54, each carrying at spaced intervals thereon feed lugs 55. These lugs, of identical construction, are spaced along the length of each of the endless chains 53 and 54, and the number of them is selected for delivery of cartons in timed relation with the suction wheel 19.

In the form of the invention illustrated there are three feed lugs on each of the endless chains. As shown in Fig. 6A, the leading end of each lug 55 inclines downwardly to a point slightly below the plate 51, each inclined surface 55*a* terminating at the trailing end in a shoulder 55*b* of a height preferably somewhat less and never any greater than the thickness of a single folded carton.

As the continuously rotating endless chains 53 and 54 move a pair of aligned feed lugs 55 toward the stack of cartons, the trailing edge of the lowermost carton is simultaneously engaged by the inclined surfaces 55*a* thereof and rides upwardly thereon. In this manner the weight of the stack is to substantial degree transferred from the plate 51 to the lugs 55. By so applying a substantial part of the weight of the stack to the lugs there is avoided any tendency of the lugs to slip beneath the stack or between adjacent cartons. The weight of the stack is used to assure firm engagement with the lowermost carton by the shoulders 55*b* firmly and positively to slide the single lowermost carton from the stack.

The front wall 50*a* of the magazine is terminated slightly above the plate 51 to provide an opening through which the lowermost carton may pass. If desired, though not essential to the invention, the front wall may include a spring biased gate 50*b* arranged resiliently to hold back the cartons above the lowermost one, the slight give of the spring biased gate 50*b* being effective to break any adherence between the lowermost carton and the one just above it, and also aiding in maintaining the cartons in vertical alignment. Preferably, side guides 56 and 57 extend from the magazine 50 in the direction of travel of each carton to guide it into the rubber or rubber-tired feed wheels 58—61. The feed wheels are so disposed as to engage the leading end of each carton prior to its release by the feed lugs 55 of the chains 53 and 54. In this manner the feed wheels 58—61 maintain proper timing of the cartons for delivery in proper register with the suction heads 18 of suction wheel 19.

In Fig. 7 a folded carton 17 is shown in registered position on the suction head 18 located at the end of the upwardly extending vertical spoke 19*a* of the wheel 19. Each suction head is of like construction and comprises, Figs. 8 and 15, a backing plate 63 secured to the outwardly flaring flange 64 of the outwardly extending spoke 19*a* of the wheel 19 and a vacuum or suction cup 18*b* of resilient material, for example, rubber or rubber-like substitutes available on the market under various trade-names, such as "Neoprene." Each cup 18*b* has an outwardly extending flange or lip throughout the periphery, and the body portion is clamped to the backing plate 63 by an upper plate 65 as by countersunk screws, Fig. 8. The plate 65 has a plurality of grooves 65*c*, Fig. 5, leading to the central opening in that plate through which suction is applied and through which the stem 68 extends. The leading end of the upper plate 65 and of the backing plate 63 is inclined downwardly, as viewed in Fig. 15, and toward the axis of wheel 19 to provide an axis 66 of rotation for the leading end of the cup and an axis of rotation 66*a* for a carton held thereby, as will be more fully explained hereinafter.

Each of the spokes 19*a*, Figs. 8 and 15, has a flow channel 19*c* communicating with an enlarged opening or chamber 19*d* into which there extends a valve 67. The housing 69, Fig. 8, of the valve is threaded into the backing plate 63 with a tubular actuating element 68 protruding outwardly of the suction head 19. The small bore in element 68 relieves the pressure in the spring compartment and smooths the action of the valve. The housing 69 has openings 69*a*, Fig. 15, normally closed by a tapered valve element under the influence of a compression spring. When the element 68 is depressed to uncover the valve openings, suction is applied around the actuating element or stem 68. Suction is applied, Figs. 6–8, to the head 18 and to the carton by way of the flow channel 19c within the spoke, and a peripherally extending flow channel 70a in a stationary wheel-supporting member 70. The peripheral channel 70a, extending about half way around the hub, communicates through a flow channel 70b, Fig. 8, to a third flow channel 70c which extends axially of the member 70 and into which there is threaded a coupling 71 leading to a pipe 72 connected to a suitable exhaust pump or other suction-applying means 76 shown in Fig. 1. The member 70, Fig. 8, is stationary, a shouldered end thereof being clamped to a frame member 73 by a nut 74. The central part of the member 70 is tapered to receive thereon an internally tapered hub member 75 pressed into and forming the hub of wheel 19. The member 75 and the wheel are urged by a compression spring 78 toward the tapered surface of the member 70 to insure at all times, despite wear of the parts, a leak-proof sliding seal or fit between the complementary tapered surfaces, the spring pressing at one end against a thrust washer 79 and at the opposite end on a nut 80 threaded on a reduced extension of member 70. A separate port 70d is provided in hub member 70 and is in communication through flow channel 70e with a further flow channel 70f leading to atmosphere or to a source of superatmospheric pressure. The suction wheel 19 is rotated by pins 81 and 82 extending into openings 83 of the wheel 19, each of the drive pins at their opposite ends being threaded into a driving plate 84. The drive assembly is enclosed in housing 84a. The drive plate is secured to a stub shaft 85 driven by a sprocket 86 which, it will be observed, is keyed thereto as at 87.

As already stated, the suction wheel 19 is rotated in timed relation with the feeding chains 53 and 54 and with the feed wheels 58—61. The manner in which the timed relation is secured between the several devices will later be described in detail. Meanwhile, the stated result of timed or synchronized operation will be assumed to be present in the operation of the several devices.

Operating in timed relation with the feed wheels 58—61 and the heads 18 of the wheel 19 is a valve actuator 88 secured to a shaft 89. As best shown in Figs. 7 and 8, as a carton 17 arrives in registered position with the suction head 18, the lower end of the valve actuator 88 presses against the central part of the folded carton 17. The lower end of the actuator 88 includes a pair of rollers 90, Fig. 8, arranged to straddle the valve stem 68. The rollers 90 are spaced apart sufficiently to clear the valve stem 68 in the absence of a carton. Thus, in the absence of a carton, as at the end of a run, the valve stems 68 of the successive suction heads are not operated, and there is avoided the possibility of losing suction on the heads to which cartons have been suction-attached. The pressure applied by rollers 90 against the carton 17 moves the valve stem or actuator 68 downwardly to uncover the ports or openings 69a, Fig. 15, to apply suction to the cup 18b strongly to hold by atmospheric pressure the carton against the cup. The lower end of the actuator 88 is preferably provided with slots 88a to provide for vertical movement of the shaft carrying the rollers 90. A spring 91 bears against a piston to bias the roller-shaft against the bottom of the slots 88a. The freedom of movement thus provided for the rollers 90 permits positive actuation of the valve stem 68 and permits, without further adjustment, the use of the device with cartons of varying thickness.

It will be remembered that the suction wheel 19 is continuously rotated, as is the valve actuator 88. Immediately following application of suction to each carton, the carton-engaging ends 20a of elements 20 descend, Figs. 9 and 10, under the control of a cam 92 into engagement with the leading end flaps 17c and 17g of the carton 17 and deflect them downwardly. The elements 20 are carried by arms 20b each secured at one end, as by set screws, to a cross shaft 20c. One arm carries a cam follower 20d actuated by cam 92. Keeping in mind that the suction head 18 moves each carton 17 in a counterclockwise direction, as viewed in Figs. 4, 7 and 9–14, it will be apparent that the inturned ends 20a of the elements 20 will immediately pass beneath the upper side flaps 17a and 17e. As soon as they move beneath the side flaps 17a and 17e, Fig. 10, the cam 92 and cam follower 20d, in conjunction with the movement of the carton to a lower position by the continued rotation of the wheel 19, raise them to exert upwardly directed carton-unfolding forces on the side flaps 17a and 17e to unfold each carton along the preformed score lines defining its side and end panels.

Since the cartons are preformed and are shipped to the packaging machine in bundles of substantial number, they ordinarily arrive tightly pressed together and while the panel-defining score lines have been formed in them, the cartons have never been opened. None of the score lines has been "broken", a term used by those skilled in the art to describe the condition of the carton before unfolding. Because the inner surfaces of the panels of an unfolded carton are pressed closely together, rapid unfolding of the carton tends to produce a zone of reduced pressure centrally of the carton strongly to resist opening thereof. However, by first depressing the end flaps 17c and 17g and thereafter the side flaps 17a and 17e, provision is made for inflow of air to eliminate this zone of reduced pressure and so permit rapid complete unfolding of the carton.

In the preferred form of the invention, two additional forces are applied which assure the opening of each carton, one a carton-bending force and the other a carton-unfolding force. The manner of applying them will now be described in detail.

Again referring to Figs. 1–A, 11, and 15, as suction is applied within cup 18b to side panel 17j of the carton positioned over the suction cup 18b with the axes 66 and 66a below the score line between end panel 17k and side panel 17i, the atmospheric pressure is effective increasingly to press the carton toward and to hold it securely on the cup 18b. That atmospheric pressure will be applied uniformly to the outer surface of the carton. It is to be noted that the atmospheric pressure to the left of the pivotal axes 66 and 66a is applied to an unsupported area of the cup 18b due to the inclination of the leading ends of the backing plate 63 and the inner clamping plate 65.

Figures 9, 10:
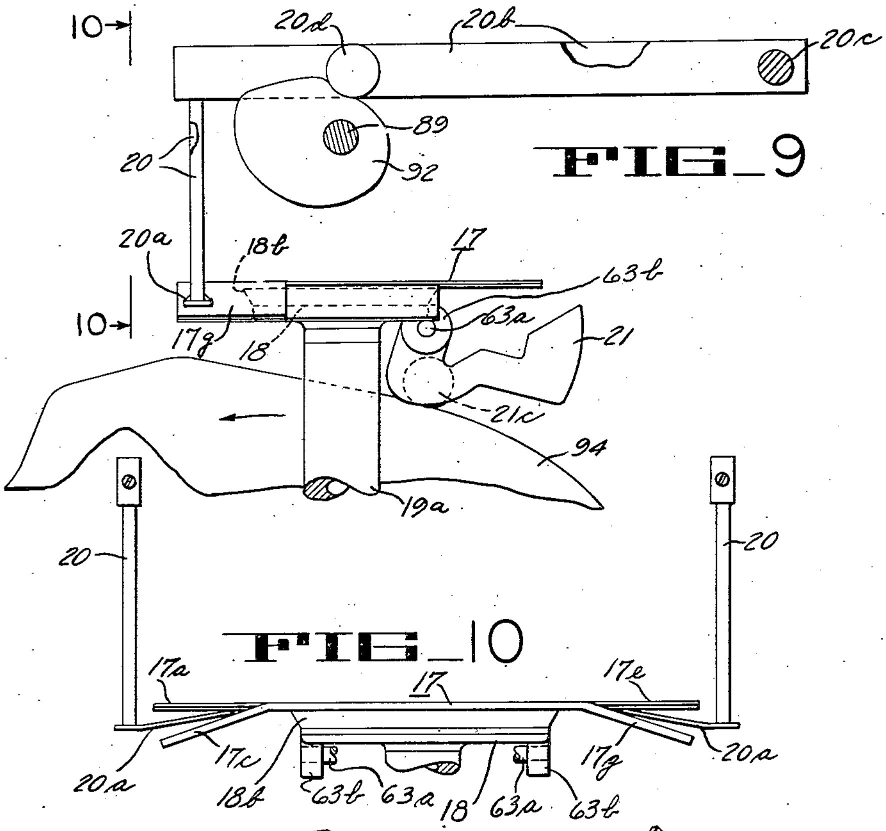
Figures 11, 12:
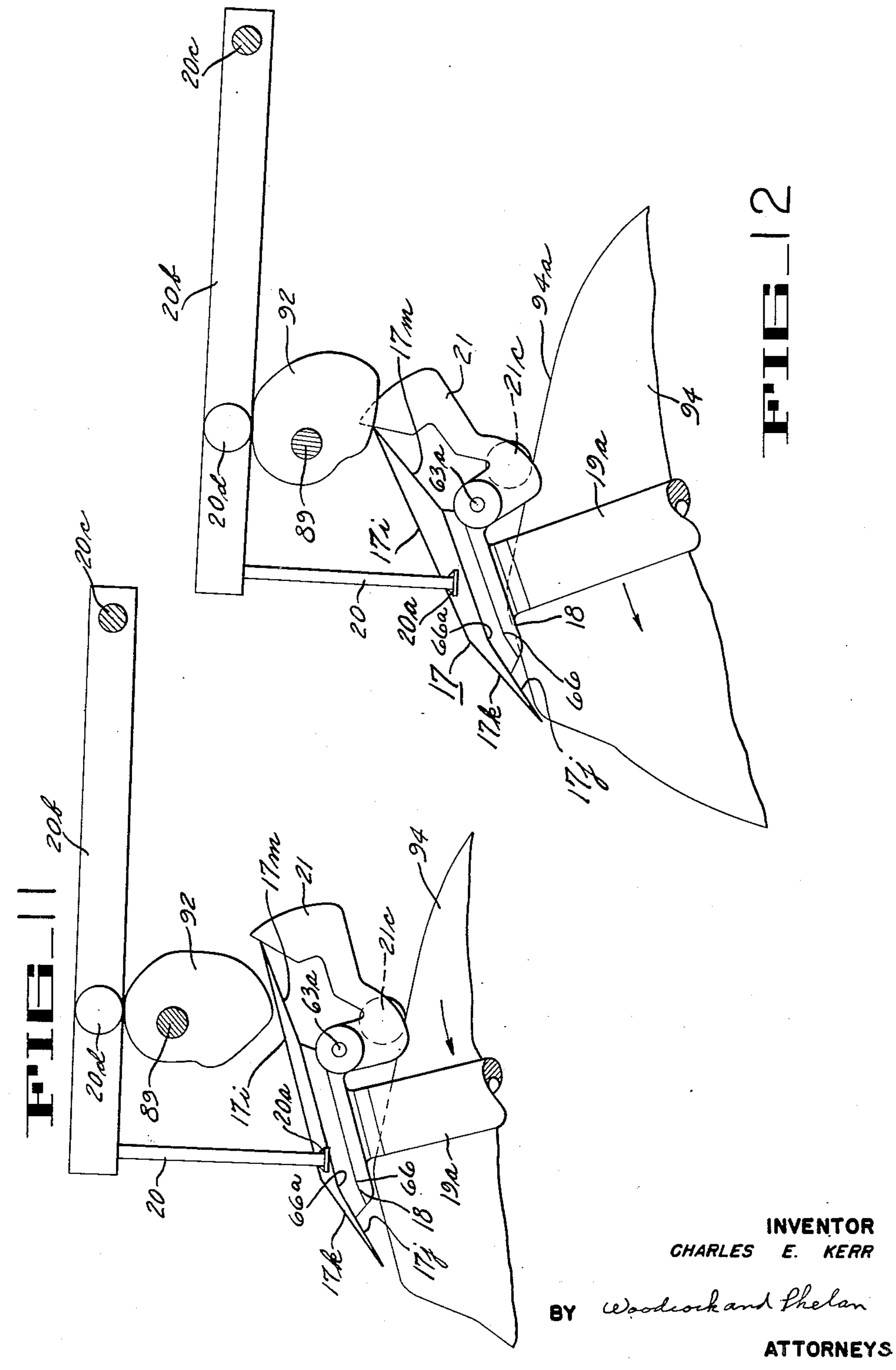

With panels 17i and 17k lying flat upon panels 17j and 17m, the atmospheric pressure will be distributed over panels 17i and 17k in the area directly above the cup 18b. With such double thickness of cardboard the atmospheric pressure, the differential of pressure, exerted thereon is likely to be ineffective to bend downwardly about the axis 66a the double thickness of cardboard extending to the left thereof. This condition of the carton is illustrated in Fig. 9. However, if the upper and lower sides of the carton are not in "air tight" relation, atmospheric pressure applied to the single thickness of cardboard comprising side panel 17j will be effective to bend it downwardly about the axis 66a as indicated in Fig. 11. The cup 18b is adequately flexible for that bending movement. The foregoing selective action as between single and double thickness cardboard has been found to be desirable as a contributing factor in the opening of cartons, particularly when there are utilized the inturned ends 20a of elements 20, Fig. 10.

In order for the inturned ends 20a to move beneath the side flaps 17a and 17e, it is necessary that one of them shall first press downwardly end flap 17c and side flap 17b disposed therebeneath, while the other presses downwardly end flap 17g and side flap 17f. In order for said flaps to be pressed downwardly, it is necessary for them to rotate about their score lines. Such rotation will readily occur if the score lines be straight. Hence, the double thickness of cardboard which prevents the bending of the leading end of the carton maintains them straight until entry of the inturned ends 20a beneath the side flaps 17a and 17e. However, as the flaps 17a and 17e are lifted by the inturned ends 20a, the atmospheric pressure then becomes effective on the panel 17j to rotate the leading end thereof downwardly about the axis 66a. The inclination of the backing plate 63 permits bending of the cup 18b, thus localizing the bending of the panel 17j along the axis 66a.

Each carton is registered on the suction cup 18b with the score line between panels 17k and 17i above or in the immediate vicinity of the axis 66a. Hence, as the leading end of panel 17j is bent downwardly with respect to the larger trailing end thereof, the action is such as to move the leading edge of the end panel 17k downwardly with respect to its trailing edge. This movement is in a carton-opening or carton-erecting direction. By so starting the carton-unfolding movement, pressure when applied to the trailing edge of the folded carton will readily unfold it even in the absence of the elements 20 and their inturned ends 20a.

When the elements 20 and their inturned ends 20a are not utilized, it will then be preferable to provide adequate suction and area for the bending of the double thickness of the carton about the axis 66a to initiate the carton-opening movement which can then be completed by the application of an opening force to the trailing edge thereof. That principal carton-opening force is applied to the trailing edge of each carton by a carton-opening arm 21 pivoted on the pivot pin 63a to ears 63b extending from the backing plate 63. Each arm 21 has thereon a cam follower 21c operatively engaging the outer cam surface of a stationary cam 94 to move the arm against the trailing edge of the carton. The shape of the cam 94 is such that as the wheel 19 rotates, the leading end of each arm 21 moves into engagement with the trailing edge of a carton, Fig. 11, at about the same time that ends 20a of elements 20 lift upwardly on the side flaps 17a and 17e of the carton. The arms 21 by pressing against the trailing edge of a carton rotate the free panel of the carton to its unfolded position (Figs. 11 to 14), about the four score lines extending horizontally across the carton.

As best shown in Fig. 8, the cam 94 is suitably secured, as by screws, to a cam-supporting drum 93 which is carried by a hub on a frame member 73a, and is held in place as by set screws 93a. By loosening the set screws 93a, the drum 93 and the cam as a whole may be adjusted simultaneously to change the time of actuation of each of the arms 21 during the course of travel of each spoke from the carton-receiving to the carton-delivering position.

Attached to each of the arms 21, Figs. 5 and 6, is one end of a tension spring 21b, the other end of which is attached, as by a threaded stud 99, as best seen in Fig. 8, to an adjacent spoke for applying a bias to each arm in a direction to maintain its cam follower 21c against the cam 94.

Referring now to Fig. 5, it will be seen that each of the arms 21 comprises carton-engaging side elements connected by a cross member 21a. It will also be seen from Fig. 5 that each suction cup 18b is of more or less rectangular shape with suction-distributing grooves 65c, to conform generally with the rectangular shape of the central panel 17j of each carton. Each of the carton-engaging edges of arms 21 is inclined so that upon movement thereof, Fig. 11, into engagement with the trailing edge of the carton, the force initially applied is largely diagonally of the carton and outwardly from the head 18 in avoidance of the application of a force along the plane of the suction head which would then tend to dislodge the carton from its suction head. Moreover, the carton-engaging edges of each arm 21 are sufficiently long and the cam 94 is of such configuration that the cartons are not only unfolded to rectangular positions, but they are moved far beyond, Fig. 14, the rectangular position, to "break" the score lines and so loosen up the carton that upon the return movement of, and later disengagement by, the arms 21, the carton will return to, and will remain in, substantially rectangular opened position.

It is again emphasized that the inclined surface 65a and the corresponding clearance provided by the inclined surface of the leading end of the backing plate 63, provide localized bending about the score line interconnecting the end panel 17k and the side panel 17i to insure unfolding of the carton rather than a buckling or breaking of the carton in the reverse direction, which has occurred with previously proposed opening devices.

As the spoke 19a continues its movement in a counter-clockwise direction from the position shown in Fig. 11 to that in Fig. 12, the cam follower 21c moves upwardly along the inclined surface 94a of the stationary cam 94 progressively to rotate the arms 21 in a counter-clockwise direction to unfold the carton. As this action occurs, the counter-clockwise rotation of the cam 92 lifts the arms 20b, the elements 20, and the inturned ends 20a to assist in the unfolding of the carton. At the same time, the carton 17 progressively moves past the inturned ends 20a. As shown in Fig. 13, the carton has been moved until the inturned ends 20a are in positions to move outwardly beyond the side flaps 17a and 17e and the adjacent end flaps 17d and 17h. The actual withdrawal of the inturned ends 20a occurs as the crest of the cam 92 approaches the cam follower 20d of the arms 20b. Thereafter, the action is rapid.

The cam follower 21c for arms 21 is moved upwardly along a rapidly inclined surface 94b, Fig. 14, of cam 94, quickly to move the arms 21 in a counter-clockwise direction to move the carton beyond its rectangular position to loosen up the carton about its four score lines and to insure that upon release by the suction head 18 the carton will remain rectangular in shape.

Prior to the rapid action by the arms 21, they function under the control of surface 94a of the cam 94 slowly and gradually to unfold each carton to a position approaching its final rectangular configuration. This preliminary slow opening movement of each carton avoids suction-producing conditions incident to a rapid initial opening and caused by rapid separation of the upper and lower walls thereof.

In view of the foregoing, it is to be understood that the cam 94 may be provided with inclined surface 94a which may extend through approximately 90° or more to slow down the initial unfolding operation more than as shown by Figs. 9–14. Following that surface would be the more rapidly inclined surface 94b for "overbreaking" the box and for return thereof to the rectangular position just prior to delivery to the conveyor.

With an eight-spoke wheel 19, there will be delivered to the conveyor four cartons for each half revolution of the wheel. By providing sixteen spokes with their associated suction heads and arms, and a correspondingly larger radius for the wheel, there would be delivered to the conveyor eight cartons per half revolution, yet the speed of opening each carton would remain the same and the function and operation of the associated devices would remain the same. However, the conveyor would be moved at twice the speed as required for an eight-spoke wheel. In this manner, any desired number of cartons per minute may be delivered to the conveyor in accordance with the invention, with the speed of opening of each low enough to ensure reliable operation of the opening mechanism and without difficulties from low air pressure zones internally of the carton.

The rate of delivery of cartons from the magazine 50 for a wheel having a greater number of spokes than the eight shown in Figs. 5 and 6 would, of course, be increased, but since no reciprocating actions are involved, the cartons may be fed from the magazine 50 as rapidly as may be desired. For example, cartons have been fed therefrom at rates greater than 300 per minute.

While in the construction shown, the elements 20 reciprocate under the control of cam 92, it is to be understood that they too may be mounted upon an endless chain in manner similar to the feeding lugs 55 and operated in timed relation to enter into each carton to apply carton-opening forces thereto.

Returning now to Figs. 6 and 7, it may again be observed that after the carton has been overbent, it returns to approximately a rectangular position, the arms 21 having been moved by cam 94 to reverse their direction of rotation so to permit the carton to spring back to rectangular form. As each carton approaches its lowermost position, the upper leading edge thereof engages the upturned ends of guiding elements 97 and 98 forcibly to move the carton away from its suction head 18. The elements 97 and 98 extend to and beyond the gluing station. Just prior to its arrival at the lowermost position, each suction head is in turn connected through the port 70*d*, Figs. 7–8, to atmosphere to remove the vacuum or suction on the rectangular box or carton 17. At that time, the carton 17, Fig. 7, has been moved well within an upwardly extending U-shaped channel forming a pocket 11 on the continuously moving conveyor 12.

The suction or vacuum applied to the suction wheel 19 remains effective for substantially a half revolution of a suction head from the top to the bottom of the wheel 19. That is, the channel 70*a*, Figs. 7–8, applies suction to each flow channel 19*c* of each spoke just before it comes into vertical position for registration of a carton thereon preparatory to application of the suction by actuation of the valve. The movement of the wheel in turn moves each spoke beyond the peripheral flow channel 70*a* just prior to attainment of the lowermost position preparatory to discharge of the carton as described. Immediately afterward each spoke is moved into communication with the port 70*d* to connect the spoke to atmosphere through the flow channels 70*e* and 70*f*, Fig. 8. A nipple threaded to the reduced end of the hub 70 may be utilized for application of a positive pressure in lieu of the foregoing connection to atmosphere, if a positive pressure is desired forcibly to eject the cartons downwardly into a conveyor pocket.

After each carton has been unfolded as above described, the end flaps 17*g* and 17*h*, at one end of the carton, are folded inwardly. This is preferably done while the carton is on the vacuum wheel 19. In the perspective view of Fig. 16 (Sheet #8), looking upwardly toward the carton as it descends to the discharge position, it will be seen that the leading end flap 17*g* engages the guiding elements 22 and 23 disposed to extend between the side flaps 17*e*, 17*f* and curved about the path of movement of the carton. The outer end of the flap 17*g* first engages the elements 22 and 23 which are also curved toward the body of the box from a position near the end of flap 17*g* to rotate the end flap 17*g* to the closed position shown in Fig. 16. As the foregoing occurs, a flap-closing element 36 is rotated into engagement with the other end flap 17*h* rapidly and effectively to move it to closed position, the element 36 being in the shape of a segment with a curved surface 36*b* of sufficient extent to hold the flap 17*h* in closed position until entry thereof beneath the guides 22 and 23 which thereafter serve to hold both end flaps 17*g* and 17*h* in closed position during continued movement of the carton with and beyond the wheel 19 to a point adjacent to the glue-applying mechanism 13, Figs. 1 and 4.

While not essential to the invention, provision has been made for adjustment of the unfolding and feeding mechanism as a whole with respect to the conveyor 12. Referring to Fig. 5, it will be seen that the frame members 73 and 73*a* are provided with supporting feet having slots 73*c* through which cap screws 73*d* extend to secure the frame members to angles 100 and 101 which are, in turn, provided with slots 100*a* through which cap screws 102 extend to hold the angles securely to the bottom frame member 103 which, it will be observed, is of channel shape with a vertically extending rib 104 for support of conveyor guide members 105 and 106, the guide members 106 being suitably secured to the members 105 along opposing surfaces thereof. The members 105 nest between the links of the conveyor chain 12 to form guiding elements in contact with the rollers of the chain.

The foregoing adjusting means are desirable for use at the time of installation of the apparatus in that they provide ready means for alignment of the suction wheel 19 with the pockets 11 on the conveyor 12 and, of course, they also provide for vertical adjustment of the wheel 19. As a result, minimum spacing of a suction head with a pocket may be provided instead of the larger clearances which might be indicated if no adjusting means were provided. Adjustment of the frame members 73 and 73*a* relative to the channel frame member 103 serves horizontally to align the mechanism as a whole including the magazine 50 and its feeding mechanism with the conveyor 12.

As best appears in Fig. 5, it will be seen that the vertically extending sides of the magazine 50 are attached to frame members 108 and 109 extending upwardly from the top of frame members 73 and 73*a*. The magazine 50 is rectangular with the mid-section of the rear wall 50*c*, Figs. 5–7, open to provide easy access to the interior for top loading of the magazine with cartons.

Inasmuch as the carton-unfolding and feeding mechanism including the magazine is a unitary assembly, it is to be understood that the arrangement with the wheel rotating about a horizontal axis is a preferred arrangement. As far as the invention is concerned, Figs. 6 and 7 may be considered as sectional elevations taken through horizontal planes with the wheel 19 rotating about a vertical axis, in which case there would only be added conventional biasing means to move the cartons through the magazine to urge them in succession against the plate 51.

*The first adhesive-coating and end-closing mechanism 13*

Referring now to Figs. 5–7, it will be remembered that the cartons are delivered in succession without interruption or change in speed into the conveyor pockets 11. Each carton slides beneath the two horizontally disposed guide rods 97 and 98. These guide rods are supported by extensions 97*a* and 98*a* respectively bolted to the frame members 73*a* and 73. The upturned ends of guide rods 22 and 23 are respectively supported from the frame member 73 by horizontal extensions 22*a* and 23*a* (Fig. 5) and, as shown in Fig. 18, they extend horizontally along one side of the conveyor 12 for a substantial distance beyond suction wheel 19. As each carton 17, Fig. 19, enters a pocket 11, the side flap 17*f* extends outwardly over the guide rod 23 and under guide 98. As each carton is moved along with the conveyor 12, the then uppermost side flap 17*f* is engaged by an upwardly curved portion 23*b* of the rod 23 to turn it upwardly. When the flap 17*f* is substantially vertical as shown at the right-hand end of Fig. 18, it will be seen that the guide rod 98 extends over and close to the upper side of the carton and behind and adjacent to the flap 17*f*. The arrangement forms a lock to secure the carton 17 from movement transversely of the conveyor, that is, along a U-shaped pocket 11.

The detailed view of Fig. 17 (Sheet #11) shows the progressive movement of the side flap 17*f* to its vertical position and also shows a guide rod 110 supported from the frame member 103 by vertical rods 111. The guide rod 110 is slidably engaged by the under side of each U-shaped channel member 11, which forms each pocket of the conveyor. Each pocket or U-shaped channel member 11, Fig. 31 (Sheet #15) has brackets 11*a* and 11*b* extending downwardly from approximately the mid-portion to receive therethrough a pivot pin 112 extending through a tubular member 113, welded or otherwise secured to a pocket-supporting link 115 of the conveyor chain 12. The pivotal arrangement of each pocket 11 is such that the pocket in the absence of a carton is substantially balanced when disposed horizontally as shown in Fig. 17 (Sheet #11). However, to insure that the pockets remain horizontal, the guide rod 110 is disposed beneath each pocket from a point in path of travel of the conveyor 12 which is in advance of the suction wheel to a point at which it is desired to rotate each pocket to bring the carton therein into a vertical position, as will later be described.

After movement of the side flap *17f* to lock the carton against lateral movement continued movement of conveyor 12 moves end flaps *17h* and *17g* behind plate 131, Figs. 18–20 and moves the flap *17e* between adhesively coated rolls 24 and 25, Figs. 20–22, the roll 24 rotating in a glue pot or reservoir 118. The adhesive-applying mechanism is generally of conventional construction. However, in accordance with the present invention, adhesive or glue is applied to both sides of the lower flap *17e* while it is inclined downwardly at an angle with respect to the central panel or body of the carton. The inclined gluing provides clearance between the roll 25 and the side panels *17k* and *17m*, thus permitting application of adhesive close to the folding line of the flap *17e* so to preclude leakage of powdered filling later introduced in the carton. The foregoing angular relation is accomplished by mounting the roll-supporting casting 120 on the inclined support of the extension *103a* of the frame 103 to incline the rolls 24 and 25 downwardly at the desired angle. In order to drive the rolls in their angular positions, a universal joint 121 interconnects a drive shaft 122 with an inclined stub shaft 123 carrying a sprocket 124 for a drive chain 125. The chain 125 is threaded over a sprocket 126 secured to the shaft of roll 24. That shaft drives a gear 127 which meshes with a gear 128 to drive the upper roll 25.

While it is preferred to incline the rolls 24 and 25 and their drive shafts, it is to be understood they may be maintained in a horizontal position and each pocket 11 and carton 17 tilted to provide the foregoing angular relationship. This has been accomplished by increasing the height of the guide rod 110 beneath the pockets 11 near the location of horizontally extending adhesive-applying rolls to tilt each pocket 11 in a counterclockwise direction as viewed in Fig. 17.

As will be apparent from Figs. 18 and 20, the end flaps *17h* and *17g* do not meet completely to close the end of contents of the carton with adhesive, the upper roll 25 is provided with a groove or slot which is effective to omit application of glue or adhesive to the upper surface of the flap *17e* in the mid-portion overlapping the opening between panels *17g* and *17h*. The second adhesive-applying mechanism 15 beyond the filling station is of substantially like construction (with the mechanism 13) and reference thereto, Fig. 27, will reveal the slot 130 providing the skip-gluing area *17s* of the flap *17b*.

Again referring to Fig. 18, it will be observed the guide rods 22 and 23 terminate at the right-hand end of the figure and that the left-hand end of an elongated plate 131 is arranged to engage the upper portions of the two end flaps *17g* and *17h* to continue holding them in closed position for passage beyond the mechanism 15. The guide plate 131 is wide enough also to engage the upper flap *17f* to hold it in vertical position to continue its locking relation with the guide rod 98 during coating of flap *17e*. The narrow plate 31 provides the desired clearance for the roll 25, Figs. 20–22. Immediately beyond plate 131, Figs. 20–21, is a bottom flap-folding element 26 which is in the form of a curved plate, the outermost point of which engages the lower adhesively coated surface of flap *17e* to move it upwardly and to press its upper adhesively coated surface against the end flaps *17g* and *17h*.

In order to hold the carton 17 against displacement by the folding element 26, there is disposed to the rear of it, Figs. 20 and 21, a conveyor belt 133 driven by a pulley 134 in the direction of and at the same speed as the conveyor 12. An idler pulley 135 supports the opposite end of the conveyor and a backing plate 136 is provided to impart rigidity to the conveyor belt 133 sliding thereacross. As the cartons leave the gluing unit and before release by the folding element 26, the ends, including the upper side flap *17b*, as seen in Fig. 21, engage the conveyor belt 133. As a result of the foregoing provisions, the cartons are held against lateral movement as the folding element 26 presses the lower side flap *17e* against the end flaps. Immediately thereafter the curved end of a guide rod 27 engages the upper leading edge of the upper side flap *17f* now beyond plate 131, to rotate it downwardly to a closed position and to press it firmly into engagement with the outer adhesively coated surface of the flap *17e*. After this has been accomplished, there is a short period of travel during which the flaps are firmly held together by a horizontal portion of the rod 27.

Advantage is taken of the weight of the carton and later of its contents, to hold the adhesively coated flaps together. This is done by tilting the pockets so to move the cartons to a vertical position in which they thereafter slide along a horizontal bottom support 139, Fig. 22, disposed beneath the closed end thereof. The rod 110, which has previously maintained the cartons and the pockets 11 in horizontal position, terminates just beyond the gluing mechanism, as seen in Figs. 20–21. The pockets 11 may not then rotate, however, due to the continuance of the rods 97 and 98 to a point just back of the pocket-turning mechanism which includes a guide rod 140. This rod is secured to the frame member 103, Fig. 22, and extends upwardly into the path of each pocket 11. As each pocket engages the curved or upwardly inclined portion *140a* of guide 140, the pocket is rotated about its pivot 112 in a clockwise direction as viewed in Fig. 22. The closed end of the carton slides downwardly along a curved guide plate 141, the curvature thereof best appearing in Fig. 22. Each carton in turn descends along the guide plate 141 until its arrival in vertical position on the support of plate 139.

As each pocket 11 is rotated in a clockwise direction, as viewed in Fig. 22, its carton 17 follows along a curved guide rod 142 which is positioned to prevent dislodgment or tumbling of the carton from its pocket. The guide rod 142, Fig. 20, then extends horizontally to form the upper side guide to hold the cartons in their vertical positions on the plate 139 for continued travel with conveyor 12. A lower side guide 143 is curved upwardly on the carton side of the guide plate 141 and extends horizontally around the filling machine 14, Fig. 1. The cartons in vertical position by continued movement of the conveyor are transported to the filling machine 14, their movement and positions being in timed relation therewith.

After the cartons enter the filling machine or mechanism 14, Figs. 4, 23 and 25, they in succession engage a carton-detecting shoe 30, which is pressed outwardly by each carton. The shoe 30 comprises two narrow arms supported on a frame 145 which has extending therefrom a member 146 secured to a link *146a* pivotally mounted at 147 and 148 between the bifurcated ends of two arms 149 and 150. The arm 149 is pivoted at one end at 151 while the arm 150 is pivoted at 152. The arm 150 comprises the lower arm of a crank, the other arm *150a* of which has a bifurcated end through which set screws 153 extend to engage notches in a vertically disposed tripping pin 32, slidably mounted in a bracket 155. Movement of the shoe 30 away from pocket member 11 rotates the crank 150—*150a* in a clockwise direction as viewed in Fig. 25 to lift the pin 32 upwardly to bring a roller 156 mounted on the end thereof into the path of a gate-opening element 33. The gate-opening element 33 is secured to a casting 157 which is continuously rotated with a ring 203*b* of the filling mechanism 14. Hence, as the end of element 33 is moved into engagement with the roller 156, it remains stationary while the pivot pin 158 thereof continues its movement with the casting 157. A gate 160 attached to the element 33 and its pivot pin 158 is thereby rotated in a clockwise direction, as viewed in Fig. 25, to open the bottom of a measuring pocket 28.

As shown in Fig. 25, a tension spring 161 extends approximately over the pivot pin 158 and exerts a force on the end of element 33 in a direction tending to rotate it in a clockwise direction while a second tension spring 162 extends substantially to the right or in front of the pivot pin 158 to apply a substantial force to the element 33, tending to rotate it in a counterclockwise direction to maintain the gate 160 in a closed position. The opening operation, however, moves the pin 158 beyond the line of action of the spring 162 to reverse the application of the force so that both springs 161 and 162 function in a direction to move the gate 160 to the open position. The over-center action of springs 161 and 162 insures rapid and effective opening movement of the gate 160. With the gate in the fully open position and against stops 160*a*, Figs. 23–24, which may be of rubber, the spring 162 is in substantial alignment with the pivot pin 158 and at that time the spring 161 is largely effective in maintaining the gate in open position. It has been found that the two springs give a better and more effective action than was attained with a single spring.

The foregoing action will also be apparent from an inspection of the parts in the various positions as shown in Fig. 23. Each of the gates 160 remains in fully open position for a travel time adequate for discharge of material from the measuring pockets 28 into the respective cartons. Thereafter, a gate-closing element 34 engages a stationary abutment in the form of a roller 35. The element 34 is secured to the lower end of the pivot pin 158 as best shown in Fig. 24. After engagement of the abutment or roller 35, by element 34, continued movement of the pivot pin 158 (Fig. 23), rotates the gate 160 in a counter-clockwise direction to reclose the measuring pocket 28 preparatory to filling with another charge of material to be delivered into a carton.

As shown in Figs. 1, 23 and 24, the filling machine 14 has a plurality of filling pockets 28 disposed in circular array below openings in a circular plate 163. The plate 163, Fig. 24, is carried by an annular casting 164 which has an upturned flange 165, Fig. 23, on which ride rollers 166 and 167 for the support of the hopper 168 and its associated mechanism.

The rollers, preferably rubber-tired wheels 166 and 167 carried by brackets 166*a* and 167*a* extending from one end of the casting 170, form two supports for the hopper assembly, while the other end of the casting 170 rests upon a spacer 172, Fig. 24, and forms the third support therefor. The plate 163 and the casting 164, together with their associated supporting elements, rotate beneath the hopper 168 which, it is observed, together with the casting 170 is spaced upwardly from the plate 163. Accordingly, there is no wear on plate 163 to shorten its life.

The hopper 168 is carried on a casting 170, Figs. 23 and 24, which has a recess concentric with a stub shaft 171 for reception of a spacer 172, Fig. 24. A second spacer or washer 173 encircles the lower end of shaft 171, and by means of a nut 174 the stub shaft 171 and plate 163 are locked together. Secured to the shaft 171 is a sprocket 175 carrying a drive chain 176 which is threaded over a sprocket 177, arranged to drive the hopper 168 through gears 178 and 178*b*, Fig. 24. In this manner as the plate 163 is rotated, the sprocket 175 rotating with it drives the hopper 168 about its vertical axis to insure free flow of material into each telescopic measuring pocket 28. The hopper and its associated mechanism cannot rotate about the axis of shaft 171 by reason of its bifurcated ends 170*a*, Figs. 23–24, between which extends a stationary pin 180 secured at its lower end, Fig. 24, to a bracket 181 extending from a frame member 182. An outwardly extending arm or stirring element 183 serves to prevent formation of aggregates or "bridges" in the hopper 168. It is carried by the casting 170 which supports the gear 178*b*. The gear 178*b* is secured to the side of hopper 168 and is guided for rotation by a cover plate 184 fastened as by screws 185 to the casting 170. The plate 184 also journals the shaft 179 carrying the sprocket 177 and gear 178.

The hopper 168 and its associated mechanism, including a downwardly extending cylindrical member 28*a* for each measuring pocket 28, is supported by a plurality of threaded studs 190 extending into threaded bushings 191. Each bushing has attached to the upper end thereof a sprocket 192 about which is threaded a drive chain 193. The drive chain is also threaded about a sprocket 194 secured to the end of a shaft 195, having at the lower end thereof an adjusting handwheel 196. By rotating the adjusting wheel 196, the threaded bushings 191 are simultaneously rotated in one direction or the other to lift or lower the casting 164, the hopper 168, and the cylindrical extension 28*a* so concurrently to increase or decrease the size of each measuring pocket as desired. An upwardly extending cylinder 28*b* attached to the ring 203*b* overlaps in telescoping relation the extension 28*a* to provide for increase and decrease of the size of each pocket.

To adjust the height of the funnel formed integrally with the casting 157, the set screw 197 is loosened for rotation of threaded bushing 199 by handwheel 198 keyed thereto at 198*a*. Rotation of handwheel 198 drives the bushing 199 threadedly engaging the hub of a drive member 200 which includes a worm wheel 200*a* in meshing engagement with a worm 208. The resulting movement of bushing 200 moves upwardly or downwardly a thrust collar 201 secured to bushing 199 as by a set screw 202 to elevate or lower the casting 203 having circular supporting rings 203*a* and 203*b* secured thereto. Each casting or sub-frame 157, being secured to the ring 203*b*, moves with it. Hence, each funnel 157*a* is adjusted upwardly or downwardly from a corresponding pocket 28 relative to a carton 17. A plurality of guide rods 205 are telescopically guided in cylindrical openings 206 to guide casting 203 during the adjustment by means of the handwheel 198 and bushing 199. Since the upper casting 164 is supported from casting 203, the hopper 168 and measuring pockets 28 as a whole are raised and lowered for adjustment of the positions of the funnels 157*a* relative to the cartons 17 without changing the size of the measuring pockets. The structural arrangements for making the foregoing adjustments are well known to those skilled in the art.

In order that the drive for the filling machine as a whole be not disturbed during the foregoing adjustments, a floating ring sprocket 210 encircles an outer driving cylinder 203*c*, a part of the casting 203, and rests upon a series of rollers 211 disposed therebeneath and supported on the stationary frame member 182. The sprocket 210 is driven from the cylinder 203*c* through a key 213, Figs. 24 and 25, extending into a keyway 214. The keyway 214 is vertically elongated for vertical movement of cylinder 203*c* relative to the key 213 which is secured to the sprocket 210. Thus, adjustment of the filling assembly as a whole does not change the position of ring gear 210 resting on the rollers 211.

Figure 2:
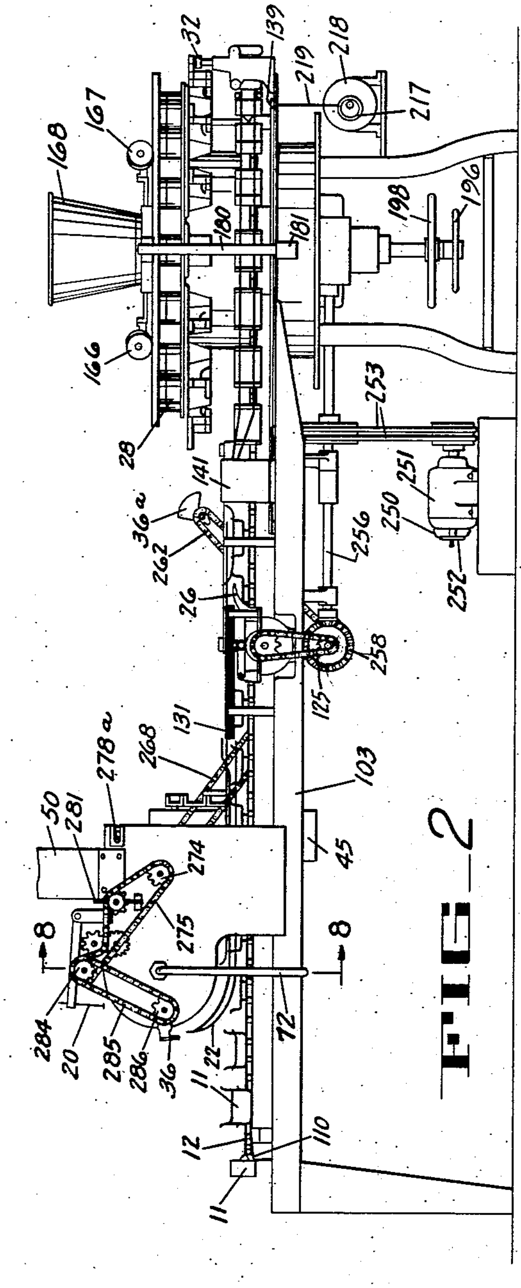
Figure 3:
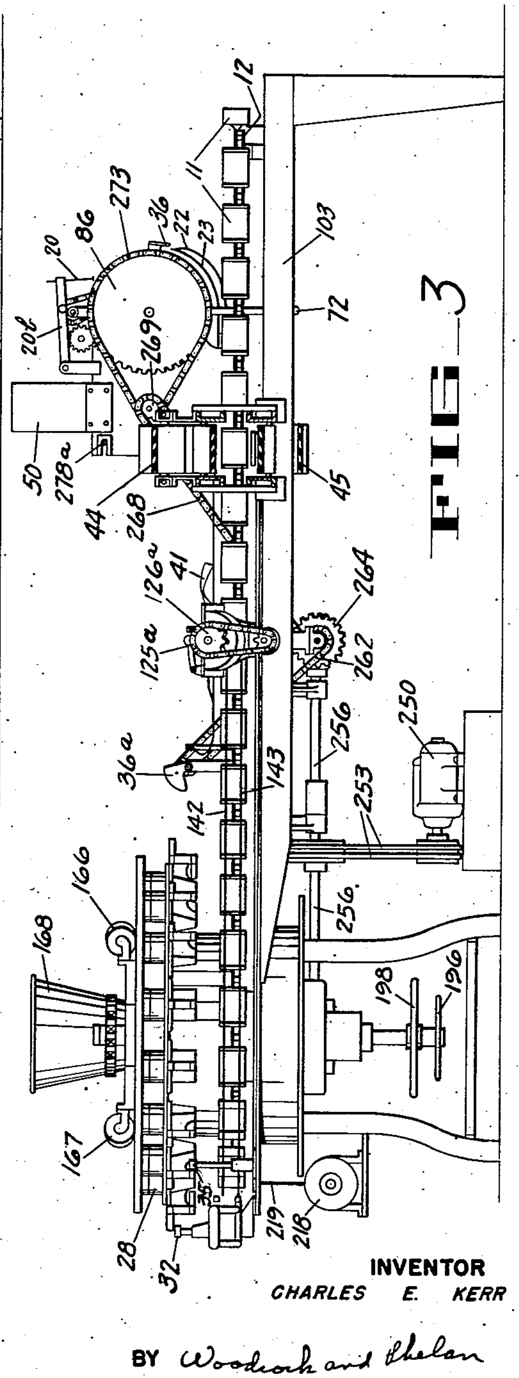
Fig. 3 is a side elevation of the other side of the apparatus taken along the line 3—3 of Fig. 1.

Below the roller-supporting member 182 is an outwardly extending circular skirt or flange 182*a* to which the frame member 103, Figs. 1 and 2, is bolted or otherwise secured. Hence, the supporting legs of the filling machine cooperate with the legs beneath the carton-feeding mechanism to support the apparatus as a whole a desired distance above the floor.

Again referring to Fig. 24, the worm wheel 200*a* which rotates the assembly including the filling pockets 28 is driven by a worm 208 secured to a drive shaft 256, Fig. 32, driven by the motor 250.

To provide for relative angular adjustment between the measuring pockets 28 and the conveyor pockets 11, the key 213 is provided with a circumferentially extending slot 213*a* for adjustment, upon loosening cap screws 215. That is, the sprocket 210 and the pockets 11 of the conveyor 12 may be adjusted relative to the cylindrical extension of member 203 to bring each funnel 157*a* extending from a measuring pocket 28 into exact alignment with a carton therebeneath. The flexibility secured by the foregoing several adjustments makes possible the use of cartons of different heights for different volumes and yet insures that each funnel 157*a* will be in proper alignment and adequately close to the top of the carton to insure filling without spillage of the material being fed thereto.

If desired, the cartons may be simultaneously vibrated during the filling thereof, as by an eccentric 217, Fig. 2, driven by a motor 218, a rod 219 abutting against the plate 139 which, along a substantial area adjacent the vibrator is not secured to any supporting means such as the lower plate 139*a*, Fig. 24. For the lighter materials, such as powders, the vibration of the cartons is desirable to settle the contents.

With the above understanding of the filling mechanism, it will be seen that material introduced into the hopper 168, such as frozen foods, powdered, or flake material, and the like, will be agitated and maintained in free flowing state by reason of the rotation of the hopper 168 about its own axis and relative to the stationary stirring arm 183. Though the hopper 168 is continuously rotated relative to member 170, the member 170 remains stationary. Assisting the agitation of the material within the rotating hopper 168 are the resultant forces due to the rotation of the pan or plate 163 therebeneath. Since the pan or plate 163 is rotating in a counter-clockwise direction, as viewed in Fig. 23, the hopper 168 will be rotated in a clockwise direction. Accordingly, that part of the hopper to the left of center, as viewed in Fig. 23, will be moving in the same direction as the pan or plate 163, whereas the part to the right of center will be moving in the opposite direction. The result on the material at the bottom of the hopper will be one of agitation where the movement of the material within the hopper will be greater on one side than on the other, the better to feed the material into each pocket 28 as it comes beneath the hopper.

It will be recalled the member 170 is spaced upwardly from the continuously rotating pan 163 to eliminate wear thereon. This spacing can result in slight over-filling of a measuring pocket 28 during transit beneath the hopper 168. Should some of the material move from a pocket 28 onto the rotating pan 163, it will be carried therealong, eventually striking against guide plates 163*a* and 163*b*, Fig. 1, which intersect centrally of the pockets 28 after reclosure of their gates 160. In this manner, any material moved onto the pan 163 will be immediately returned to an empty measuring pocket and will thereby be placed in a carton the next time such measuring pocket comes into registration with a carton on the conveyor 12.

The disposition of the casting 170 above the pan 163 and the provision of the rim or upturned flange 165 of the casting 164, forming a part of the pan, is particularly desirable in not only simplifying construction but also in locating the rubber or rubber-tired wheels or rollers 166 and 167 in positions remote from any possible flow of material to them from hopper 168. The geometrical three-point support also simplifies the mounting of the hopper 168 and insures maximum mounting stability of it and its associated parts.

*The second adhesive-coating and end-closing mechanism 15*

After the filling of the cartons, they are moved by the conveyor 12 to bring them in succession to a flap-folding rod 37, Fig. 26, supported on a bracket 229. The leading end flap, shown by the broken lines, is folded downwardly to closed position. Operating in timed relation with the conveyor 12 is the segment 36*a* which serves to fold inwardly the trailing end flap 17*d* for passage below the rod 37. The flap 17*d* and segment 36*a*, shown by broken lines, illustrate the described operations. Both end flaps 17*c* and 17*d* then move beneath the rod 37 where they are held in closed position.

As indicated in Fig. 1, the side elevation of Fig. 26 was taken along the line 26—26. While Fig. 27 is a plan view of Fig. 26, it will be seen that it has been taken looking down from the near side of the apparatus as shown in Fig. 1. The arrows appearing near the conveyor 12 in Figs. 26 and 27 show the direction of travel of the cartons.

Branching from the guide rod 37 is a side guide rod 38 arranged to deflect the side flap 17*b* downwardly—not to a horizontal position—but one short of it so that each flap 17*b* is inclined slightly upwardly from the horizontal for passage between the similarly inclined adhesive-applying rolls 24*a* and 25*a*. The inclination of the rolls 24*a* and 25*a* provides clearance for the reservoir 118*a* and the adjacent side of carton 17 and thus permits coating of flap 17*b* to its score line.

The adhesive-applying mechanisms 13 and 15 are of like construction except for the angular dispositions of the adhesive-applying rolls and their shafts. Accordingly, the parts of the adhesive-applying mechanism 15 have been given the same reference characters as those of the device 13 with the addition of the subscript "*a*."

As the inclined side flap 17*b* passes between the rollers 24*a* and 25*a*, adhesive is applied to both surfaces thereof with the central portion 17*s*, Fig. 27, free of adhesive. The flap 17*b* then engages the knife-like edge of the folding element 41 which rotates the side flap 17*b* against the end flaps 17*c* and 17*d*. The side flap 17*a* is folded downwardly by the inclined part of a flap-turning rod 42 secured to a bracket 228, Figs. 27 and 28, bolted to a frame member 103. The flap is turned to fully closed position and pressed against the adhesively coated upper surface of the flap 17*b* and is there held in position until arrival, Figs. 29 and 30, in registered position with conveyor belts 44 and 45 of the compression unit 16.

Operating in timed relation with the conveyor 12 is a cam 230 arranged to engage a cam follower 231 carried by a cross member 232 to actuate push rods 43, slidable in a bracket 232*a*, against the bias of compression springs 235 and 236 in turn to move each filled and closed carton from its channel pocket 11 into and between the belts 44 and 45. On the ends of push rods or plungers 43 are cross members 237 and 238 to distribute the thrust forces over the rear surface of the top and bottom of the carton. As each carton is substantially in registered position with the belts 44 and 45, the cam 230 rapidly moves each carton 17 into the space between belts 44 and 45 where they are frictionally gripped. They are slowly moved through the compression unit 16 with the flaps pressed together, the time required for transit therethrough being adequate for the setting of the adhesive. The unfolded, filled and sealed cartons are then ready for shipment to the ultimate consumer. The compression unit 16, though a desirable adjunct to the machine as a whole, does not form a part of the present invention. It has its own separate drive, an idler pulley 300 and supporting pulleys 301—303 being shown in Fig. 29.

Returning now to Fig. 24, it will be seen that the rod 140 extends around and behind (on the conveyor side of) the pockets 11 in the filling mechanism, while the rods 142 and 143 are in front of the pockets. The rod 140 is also seen at the right-hand end of Fig. 20. The rod 140 continues behind the channel pockets 11 beyond the filling mechanism, as appears from Fig. 26. Thus, the rod 140 gives support to the channel pocket 11 and prevents rotation thereof upon engagement of each carton 17 with the carton-detecting shoe 30 of the filling mechanism.

After delivery of each carton to the compression unit 16, Fig. 1, the channel pockets 11 remain in their respective positions at the side of the conveyor chain 12 until engagement, Figs. 1 and 2A, with the rod 110 which is disposed in their path. After engaging rod 110, each channel pocket 11 rides upwardly along an incline thereof and is thereby rotated about its pivot until again horizontally disposed above the conveyor chain 12. The pockets 11 then pass in succession below the carton erecting and feeding mechanism 10 to receive cartons in manner already fully described.

*The synchronized drive*

The manner in which each of the several components are operated in timed relation one to the other will now be described in connection with Fig. 32, a diagrammatic perspective view looking in the direction of the arrow 32—32 of Fig. 1.

A driving motor 250 is included in a housing with a Reeves drive 251 or other suitable speed-changing arrangement operable as by a handwheel 252. Multiple V-belts 253 extend from a drive pulley 254 to a driven pulley 255 secured to a drive shaft 256. To one end of the shaft 256 is secured the worm 208 which meshes with the worm wheel 200*a* which drives the filling mechanism 14, as shown in detail in Fig. 24. The floating sprocket 210 driven by worm wheel 200*a* through rods 205 is diagrammatically shown driving the conveyor chain 12. On the other end of the drive shaft 256 is a bevel gear 257 meshing with bevel gear 258 secured to a second drive shaft 122. This drive shaft 122 has at one end the universal joint 121 for the gluing mechanism 13, the driving sprocket 124, the chain 125 and the driven sprocket 126, all appearing in Fig. 32. Secured to drive shaft 122 is a bevel gear 259 meshing with a bevel gear 260 which drives the pulley 134 for the compression belt 133 which forms a movable backing member for cartons as they leave the gluer or adhesive-applying mechanism 13. At the opposite end of shaft 122 is a sprocket 261 on which is threaded a chain 262 arranged to drive through sprocket 263 the flap-turning element 36*a* secured to shaft 263*a*.

Also secured to the shaft 122 is a spur gear 264 meshing with a gear 265 secured to a shaft 266 which has attached thereto at one end a sprocket 267 and a chain 268 threaded thereon. The chain 268 drives the sprocket 269 secured to one element of an angularly adjustable coupling 270, Figs. 1 and 5, the other element of which drives a shaft 271. By angularly adjusting one element with respect to the other, a timing adjustment may be made between the conveyor pockets 11 and the suction wheel 19, since there is secured to the shaft 271 a sprocket 272, Fig. 32, carrying a chain 273 threaded over a large sprocket 86 which is itself secured to a stub shaft 85 carrying the drive plate and drive pins 81 and 82, Fig. 8, for the suction wheel 19.

On the opposite end of shaft 271 is a sprocket 274 carrying a chain 275. The chain is threaded over an idler 276, a sprocket 277 rotatably mounted on a shaft 278, a sprocket 279, and a sprocket 280 secured to a shaft 89.

By operating clutch lever 281, Figs. 5 and 8, to initiate or interrupt feed of cartons from the stack, a clutch member 281*a* is moved into and out of engagement with a clutch member 281*b* secured to the sprocket 277 to drive the shaft 278 upon which the clutch member 281*a* is splined. Secured to the shaft 278 are the driving sprockets 282 and 283, Figs. 6 and 7, of the carton-feeding chains 53 and 54.

The shaft 89, driven by the sprocket 280, as explained in connection with the operation of the carton-feeding mechanism, drives the valve-actuating arm 88 and the cam 92 on which bears the cam followers of the arms 20*b*, Figs. 5–8. On the end of the shaft 89 is secured a sprocket 284 carrying a drive chain 285 for a sprocket 286 which drives the flap-turning element 36 of the carton-feeding mechanism 10 through bevel gears 287, Fig. 16.

The drive sprocket 279 is secured to the shaft 288 which carries the upper drive wheels 58 and 60 for feeding the flattened cartons to suction heads 18. The shaft 288 also has a pair of spur gears 290 and 291 (Fig. 8) respectively meshing with spur gears 292 and 293 secured to stub shafts journaled within housings 294 and 295, which have respectively attached thereto the lower drive wheels 59 and 61, Fig. 8.

Referring again to the cross shaft 266, Fig. 32, driven by gear 265, it will be observed that there is attached to it a sprocket 296 carrying a chain 297 arranged to drive through a sprocket 298 and through spur gears 299, Fig. 29, the carton-removing cam 230 which functions to operate plungers 43 to eject cartons from the conveyor 12 into the compression unit 16.

Also attached to the shaft 266 is the universal joint 121*a* which drives the sprocket 124*a* for the drive chain 125*a* of the gluing mechanism 15.

In both of gluing mechanisms 13 and 15, Figs. 20, 22 and Figs. 26, 27, each of the driven sprockets 126 and 126*a* drives the lower adhesive-carrying rolls 24 and 24*a*. On the shafts of the lower rolls are carried the gears 127 and 127*a* to drive the gears 128 and 128*a*. As shown in Figs. 20, 26 and 27, the gears 128 and 128*a* are carried by bifurcated arms 137 and 137*a* respectively pivoted by pins 138 and 138*a* extending through stationary ears of the frame. By pivotally mounting each assembly, the upper adhesive-applying rollers 25 and 25*a* may be swung away from the lower roller for cleaning purposes. The pivotal arrangement also provides a gravity bias to press each upper adhesive-applying roller downwardly against the lower cooperating roller.

By providing the single drive from the motor 250 with provisions for relative adjustment of the several mechanisms, a timed or synchronized relation is established and maintained for operation of the system as a whole both at low and at high speeds.

Now that the construction and operation of the system as a whole, and its component parts, have been fully explained, it will be understood that modifications may be made within the scope of the appended claims, and it is to be further understood that certain features and sub-combinations will be useful in other systems, though particularly well suited to the apparatus disclosed herein.

What is claimed is:

1. An automatic feeding device for folded cartons to be stacked one behind the other comprising a supporting plate at a delivery end of said stack, an endless feeder chain, feeding elements carried by said chain and slidable over the surface of said plate adjacent said stack to push a carton from said stack, restraining means for engaging cartons behind the outermost carton to permit successive feeding of the outermost cartons from the stack, feed wheels arranged in axially spaced pairs with each pair adapted to receive therebetween each carton as it is pushed from said stack for moving the carton to a predetermined position, a continuously rotating suction head driven in timed relation with and between said spaced pairs of feed wheels, means operable upon arrival of the carton in predetermined relation with said rotating suction head for applying suction thereto to hold it in fixed position, and means for unfolding the carton while supported by said suction head.

2. An automatic feeding device for feeding cartons to a conveyor from a vertical stack of folded cartons having outwardly extending flaps horizontally disposed comprising a supporting plate for said stack, feeding means for sliding from said stack in succession the lowermost carton, feed wheels arranged to receive each carton as it is removed from said stack, a continuously rotating suction head driven in timed relation with said feeding means to receive from said wheels a carton in registered position thereon, means operable upon arrival of the carton in said registered position to apply suction to said head to hold the carton in fixed position, a carton-opening arm carried by said suction head and movable relative to said head along its path of rotation for unfolding the carton while held by suction and rotating with said head, and means for delivering unfolded cartons from said suction head.

3. An automatic feeding device for feeding cartons to a conveyor from a stack of horizontally disposed folded cartons comprising a supporting plate for said stack, feeding means for sliding in succession the outermost carton from said stack, rotating feed structure arranged to receive each carton as it is removed from said stack, a continuously rotating wheel carrying at each of a plurality of spaced peripheral locations a suction head driven in timed relation with said feeding means to receive from said rotating structure a carton in registered position thereon, means operable upon arrival of the carton in said registered position to apply suction to said head to hold the carton in fixed position, carton-opening arms pivotally carried by said suction head for unfolding the carton while held by suction and rotating with said head, and means for delivering an unfolded carton from said head.

4. An automatic feeding device for folded cartons horizontally disposed in a stack comprising a continuously rotating spider having regularly spaced spoke-like elements each terminating at its outer end in a suction head, a passage for applying suction to each of said heads, a valve mechanism within each of said spoke-like elements for controlling the application of said suction to its associated head, said valve mechanism having an element one end of which extends outwardly of the surface of said suction head, mechanism for removing the outermost folded carton from said stack and delivering it in registered position with a suction head at the time said head is in a position adjacent thereo, means operable in timed relation with said suction head and said removing mechanism for depressing the central part of said carton to actuate said valve element to apply suction to said head to hold said carton in fixed position, a carton-opening arm supported on each spoke-like element having a cam follower, a stationary cam engaging each said cam follower for moving said arm against said carton to unfold it during the time it is held by suction on its associated suction head, and means for applying in succession to each suction head a pressure at least that of the atmosphere to discharge an unfolded carton therefrom.

5. An automatic feeding device for folded cartons to be disposed one behind the other in a supply magazine comprising a continuously rotating suction head arranged to receive from said supply magazine a folded carton in registered position thereon, means for applying suction to said head for holding the carton in fixed position, means carried by and movable relative to said suction head along its path of rotation for engaging a folded side of the carton to unfold the carton while held by suction and rotating with said head, and means for removing suction from said head for release of the unfolded carton therefrom.

6. An automatic feeding device for folded cartons of the type having side and end panels and flaps and adapted to be disposed one behind the other in a supply magazine comprising a continuously rotating suction head arranged to receive from said supply magazine a folded carton with a side panel in registered position thereon, means for applying suction to said head for holding the carton in fixed position with the flaps extending outwardly from said head, a carton-opening element, means for moving said element in timed relation with said suction head first to engage at least one end flap to press said end flap downwardly for movement of said element beneath at least one side flap and then for moving said element to engage said side flap and in a direction away from the suction head for application to the carton of an opening force, said carton-opening element being disposed for passage between the side flap it engages and the trailing end flap, an erecting arm pivotally supported on said suction head, means operable by rotation of said suction head for moving said erecting arm against an edge of the carton progressively to unfold the same as it is rotated with said head, and means for removing suction from said head for release therefrom of an unfolded carton.

7. An automatic feeding device for folded cartons to be disposed one behind the other in a supply magazine comprising a continuously rotating wheel having a plurality of suction heads each disposed to receive in turn from said supply magazine a folded carton in registered position thereon, means for individually controlling the application of suction to each head to hold the carton received thereby in fixed position, a carton-erecting arm for each suction head carried by said wheel, common means for actuation of each of said carton-erecting arms for relative movement along the periphery of said wheel to engage the exterior of a folded side of each carton progressively to unfold each carton to its fully opened position as it is rotated with said wheel, and means for removing in succession suction from said suction heads for release in predetermined timed relation of unfolded cartons therefrom.

8. An automatic feeding device for folded cartons having end flaps and side flaps and to be disposed one behind the other in a supply magazine comprising a continuously rotating wheel having a plurality of spoke-like elements each terminating in a suction head and each disposed to receive in turn from said supply magazine a folded carton in registered position thereon, means for applying in succession suction to each head to hold the carton received thereby in fixed position, a cartoon-engaging element movable in timed relation with said wheel for entry between the leading end flaps and the side flaps of the carton and thereafter movable away from each suction head to apply a carton-opening force to each carton, a carton-erecting arm carried by each spoke-like element and suction head, means for actuating each of said carton-erecting arms for relative movement along the periphery of said wheel to engage a folded side of each carton to press it to opened position as it is rotated with said wheel, and means for removing in succession suction from said suction heads for release of unfolded cartons therefrom in predetermined timed relation.

9. An automatic feeding device for folded cartons to be disposed one behind the other in a supply magazine comprising a continuously rotating wheel having a plurality of suction heads each disposed to receive in turn from said supply magazine a folded carton in registered position thereon, means for applying suction to each head to hold the carton received thereby in fixed position, a carton-erecting arm for each suction head carried by said wheel, common means for actuation of each of said carton-erecting arms for relative movement along the periphery of said wheel to engage a folded side of each carton progressively to unfold it while it is held by suction and rotated with said wheel, said common means being effective to unfold each carton during movement of the carton and suction head through a substantial angle whereby the carton-opening movement may be relatively slow with relatively high angular speed of the suction head, and means for removing in succession suction from said suction heads for release in predetermined timed relation of unfolded cartons therefrom.

10. An automatic feeding device for folded cartons having end flaps and side flaps and to be disposed one behind the other in a supply magazine comprising a continuously rotating wheel having a plurality of suction heads each disposed to receive in turn from said supply magazine a folded carton in registered position thereon, means for applying suction to each head to hold the carton received thereby in fixed position, a carton-erecting arm carried by said wheel for each said suction head, each arm having a cam follower, a stationary cam disposed for engagement by each cam follower and having a contour throughout a substantial angle of movement of said wheel for moving each carton-erecting arm relative to said wheel along its path of rotation and into engagement with a folded side of each carton to unfold the carton while it is held by suction and rotated with said wheel through said substantial angle of movement, and means for removing in succession suction from said suction heads for discharge therefrom in predetermined timed relation of unfolded cartons.

11. The combination set forth in claim 10 in which carton-engaging elements are movable in timed relation with said suction heads between the leading end flap of each carton and a side flap and thereafter outwardly from the suction heads to press the upper wall of the carton toward an unfolded position as said carton-erecting arm engages the exterior of the folded side of the carton.

12. An automatic feeding device for folded cartons disposed one behind the other in a supply magazine comprising a continuously rotating suction head arranged to receive from said supply magazine a folded carton in registered position thereon, said suction head including a plate having leading and trailing ends and a suction cup of resilient material extending outwardly of said plate for engaging each carton to hold the folded sides thereof adjacent said leading and trailing ends, said plate at a point spaced from the leading end thereof being inclined away from the plane of the remainder of said plate to provide a pivotal axis across said cup, means for applying suction to said head for holding said carton in fixed position, the differential pressure upon said cup upon application of said suction being effective to apply a bending force about said axis in a direction tending to unfold the carton, means for engaging the trailing folded side of said carton to move it to an unfolded position during subsequent rotation of said head, and means for removing suction from said head for release therefrom of an unfolded carton.

13. In an automatic feeding device for folded cartons, a movable suction head for holding in registered position thereon one of said cartons, the suction head including a cup of resilient material, a plate disposed along the bottom of said cup having that portion thereof disposed in the direction said head is to be moved inclined away from the outer surface thereof to provide a pivotal axis across said cup, means for applying suction to said head for holding the carton in fixed position, the differential pressure within and without said cup being effective to apply a bending force to rotate about said axis that part of the carton disposed above said inclined portion of said plate, said force being in a direction tending to unfold the carton, and means for applying an additional force to the carton to unfold it while it is held by said suction cup.

14. In an automatic feeding device, the sub-combination of a suction head for holding flexible material comprising a suction cup of resilient material having a circumferential lip extending outwardly from a flat base portion thereof, said base portion of said cup having means for dividing the cup into two zones one of which is of less depth than the other, the juncture of said zones forming a pivotal axis for flexible material held by said suction cup, the differential of pressure within and without the cup resulting from application of suction to the flexible material held by said cup producing rotation of said flexible material about said axis.

15. An automatic feeding device for folded cartons having panels separated by score lines and to be disposed one behind the other in a supply magazine comprising a continuously rotating suction head arranged to receive from said suply magazine a folded carton in registered position thereon, said suction head including a cup of resilient material having a flexible outwardly extending circumferential rim and a base of substantial area, said base including means to provide two levels within said cup, the juncture of the lower level with the upper level providing an axis of rotation for a folded carton held thereby, the carton being disposed on said head with a score line substantially in alignment with said pivotal axis for application to the carton of a bending force tending to rotate panels of the carton on each side of said score line in carton-opening directions.

16. An automatic feeding device for folded cartons to be disposed one behind the other in a supply magazine comprising a continuously rotating suction head arranged to receive from said supply magazine a folded carton in registered position thereon, said suction head including a backing plate, a clamping plate, and a suction cup of resilient materal clamped between said plates and having a rim for engaging each carton, said plates having leading and trailing ends and along the sides adjacent their leading ends both being inclined away from the rim of said cup to provide a pivotal axis, means for applying suction to said head for holding said registered carton in fixed position, the differential pressure within and without said cup being effective to apply a bending force to the carton in a direction to rotate the leading end of the carton downwardly about said axis, said force and resulting downward movement of its leading end portion aiding the unfolding of the carton, means carried by and rotatable with said suction head for engaging the trailing side of the carton to unfold it during subsequent rotation of said head, and means for removing suction from said head at a point in its rotation subsequent to that at which said means to unfold operates for release therefrom of an unfolded carton.

17. An automatic feeding device for folded cartons to be disposed one behind the other in a supply magazine, continously rotating feeder elements for engaging cartons one after the other to push them from said magazine, a continuously rotating wheel having spaced one from the other about its periphery a plurality of suction heads each disposed to receive in turn from said supply magazine a folded carton in registered position thereon, means for applying suction to each head to hold the carton received thereby in fixed position, a carton-erecting arm carried by said wheel for each said suction head, common means for actuation of each of said carton-erecting arms for relative movement along the periphery of said wheel to engage a folded side of each carton progressively to unfold it as it is held by suction and rotated with said wheel, and means for removing in succession suction from said suction heads for release in predetermined timed relation of unfolded cartons therefrom.

18. An automatic feeding device for folded cartons to be disposed one behind the other in a supply magazine comprising continuously rotating feeder elements arranged to push in succession cartons from said magazine and to move each carton to a predetermined position, a continuously rotating wheel having a plurality of suction heads disposed about the periphery thereof and each disposed to receive in turn from said predeterimned position a carton delivered thereto, means for applying suction to each head to hold the carton received thereby in fixed position, a carton-erecting arm carried by said wheel for each said suction head, common means for actuation of each of said carton-erecting arms for relative movement along the periphery of said wheel to engage a folded side of each carton progressively to unfold it as it is held by suction and rotated with said wheel, and means for removing in succession suction from said suction heads for release therefrom in predetermined timed relation unfolded cartons.

19. An automatic feeding device for folded cartons to be disposed one behind the other in a supply magazine, continuously rotating feeder elements rotatable in spaced relation one to the other to push in timed relation cartons from said magazine and to move each carton to a predetermined position, a continuously rotating wheel having a plurality of spoke-like elements each terminating in a suction head and each disposed in turn for movement to said predetermined position to receive thereon a carton, means for applying suction to each head to hold the carton received thereby in fixed position, means operable after movement of said suction head and a carton through approximately 180° for removing suction from each said head for release therefrom of each carton, a carton-erecting arm carried by each spoke-like element and suction head, and common means for actuation of each of said carton-erecting arms for relative movement along the periphery of said wheel in the direction of its rotation to engage a folded side of each carton progressively to unfold it as it is held by suction and rotated with said wheel through said substantially 180°.

20. An automatic feeding device for folded cartons to be disposed one behind the other in a supply magazine comprising a continuously rotating wheel having a plurality of spoke-like elements each terminating in a suction head and each disposed to receive in turn from said supply magazine a folded carton in registered position thereon, means for applying suction to each head controlled by delivery of a carton to said head to hold the carton received thereby in fixed position, a pair of interconnected carton-erecting arms spaced apart one from the other transversely of the plane of said wheel, means pivotally supporting said arms from said suction head, a spring extending from said interconnected arms to an adjacent spoke-like element for biasing said arms for rotation in one direction relative to said wheel, said interconnecting arms having a cam follower, a stationary cam for engaging said cam follower for controlling the movement of said interconnected arms, said cam having a shape for moving said arms into engagement with a folded side of each carton progressively to unfold it as it is rotated with said wheel, and means for releasing said suction to discharge the unfolded cartons from said suction heads in predetermined time-sequence.

21. The combination set forth in claim 20 in which carton-engaging elements are curved outwardly into the path of an oncoming carton for engagement by said carton for application thereto of a directed force to insure positive removal of each carton from its suction head in said predetermined time-sequence.

22. The method of erecting a folded carton which comprises applying suction to a lower wall thereof, supporting said carton during the application of said suction on a surface a part of which is substantially horizontal and a part of which is inclined at an angle to define an axis of rotation, and utilizing the atmospheric pressure above said inclined surface for bending a part of the carton downwardly along said inclined surface thereby to initiate unfolding of the carton about a score line in a direction such that application of a carton-opening force to a trailing edge thereof will erect the carton.

23. An automatic feeding device for feeding folded cartons of the type having side and end flaps comprising a continuously rotating suction head for receiving and holding a folded carton thereon by suction, means for unfolding the carton while held by and rotating with said head, flap-engaging elements for folding inwardly the end flaps at one end of the carton while held by said head, and means for removing the carton from said head with the end flaps held in their inwardly folded positions.

24. The method of erecting a folded carton having upper and lower walls disposed in overlapping relation and each defined by a score line and a folded edge of said carton disposed in parallel relation which comprises supporting said folded carton in a plane, applying suction to said lower wall, bending a portion of said carton adjacent one of said folded edges about an axis substantially parallel thereto and out of said plane to initiate unfolding of said carton about said score lines, and applying a carton-opening force at the opposite one of said folded edges to erect said carton.

25. The method of erecting a folded carton having upper and lower walls disposed in overlapping relation and each defined by a score line and a folded edge of said carton which comprises supporting said folded carton in a plane, applying suction to said lower wall, bending a central portion of said lower wall adjacent said one of said folded edges out of said plane to initiate unfolding of said carton about said score lines, and applying a carton-opening force at the opposite one of said folded edges to erect said carton.

26. The method of erecting a folded carton having upper and lower walls disposed in overlapping relation and each defined by a score line and a folded edge of said carton which comprises supporting said folded carton in a plane, applying suction to said lower wall, bending a portion of said carton adjacent one of said folded edges out of said plane by utilizing the atmospheric pressure above said portion thereby to initiate unfolding of said carton about said score lines, and applying a carton-opening force at the opposite one of said folded edges to erect said carton.

27. The method of erecting a folded carton having upper and lower walls disposed in overlapping relation and each defined by a score line and a folded edge of said carton which comprises supporting said folded carton in a substantially horizontal plane, applying suction to said lower wall, bending a portion of said lower wall adjacent one of said folded edges out of said plane by utilizing the atmospheric pressure above said portion thereby to initiate unfolding of said carton about said score lines, and applying a carton-opening force at the opposite one of said folded edges to erect said carton.

28. An automatic feeding device for folded cartons to be disposed one behind the other in a supply magazine, continuously rotating feeder elements for engaging cartons one after the other to push them from said magazine, a continuously rotating wheel having spaced one from the other about its periphery a plurality of suction heads each disposed to receive in turn from said supply magazine a folded carton in registered position thereon, means for applying suction to each head upon receipt of a carton to hold the carton received thereby in fixed position, a carton-erecting arm carried by said wheel for each said suction head, common means for actuation of each of said carton-erecting arms for engaging a folded side of each carton progressively to unfold it as it is rotated with said wheel, said actuation of said carton-erecting arms being controlled by said common means to provide a slow opening movement of each carton to avoid suction-producing conditions, followed by a quick movement of said arms to move each carton beyond its fully unfolded position to insure that upon release by said suction head the cartons will remain unfolded, and means for removing in succession suction from said suction heads for release in predetermined timed relation of unfolded cartons therefrom.

29. An automatic feeding device for folded cartons to be disposed one behind the other in a supply magazine comprising continuously rotating feeder elements arranged to push in succession cartons from said magazine and to move each carton to a predetermined position, a continuously rotating wheel having a plurality of suction heads disposed about the periphery thereof and each disposed to receive in turn from said predetermined position a carton delivered thereto, means for applying suction to each head upon receipt of a carton to hold the carton received thereby in fixed position, means for applying a bending force to a panel of each carton to assist in unfolding thereof while held by said heads, a carton-erecting arm carried by said wheel for each said suction head, common means for actuation of each of said carton-erecting arms for engaging the exterior of a folded side of each carton progressively to unfold each carton to at least its fully opened position as it is rotated with said wheel, and means for removing in succession suction from said suction heads for release therefrom in predetermined timed relation of unfolded cartons.

30. An automatic feeding device for folded cartons to be disposed one behind the other in a supply magazine, continuously rotating feeder elements rotatable in spaced relation one to the other to push in timed relation cartons from said magazine and to move each carton to a predetermined position, a continuously rotating wheel having a plurality of spoke-like elements each terminating in a suction head and each disposed in turn for movement to said predetermined position to receive thereon a carton, means for applying suction to each head to hold the carton received thereby in fixed position, means operable after movement of said suction head and a carton through approximately 180° for removing suction from each said head for release therefrom of the carton, a carton-erecting arm carried by each spoke-like element and suction head, and common means for actuation of each of said carton-erecting arms for engaging a folded side of each carton progressively to unfold it as it is rotated with said wheel through said substantially 180°, said actuation of said carton-erecting arms being controlled by said common means to provide a slow opening movement of each carton to avoid suction-producing conditions, followed by a quick movement of said arms to move each carton beyond its fully unfolded position to insure that upon release of said suction heads the cartons will remain unfolded.

31. An automatic feeding device for folded cartons to be horizontally disposed in a stack comprising a supporting plate at the delivery end of said stack, an endless feeder chain, feeding elements carried by said chain and slidable along the surface of said plate adjacent said stack to push a carton from said stack, restraining means for engaging cartons behind the outermost one to permit successive feeding of the outermost cartons from the stack, carton-transporting means arranged to receive each carton as it is pushed from said stack for moving the carton to a predetermined position, a continuously rotating suction head driven in timed relation with said feeder chain and said carton-transporting means, means operable upon arrival of the carton in predetermined relation with said suction head for applying suction thereto to hold it in fixed position, said last-named means including actuator means driven in timed relation with said carton-transporting means and said rotating suction head, at least one carton-opening element disposed adjacent the path of said rotating suction head, means operable in timed relation with said rotating head for moving said carton element within the folded carton, said element by virtue of continued rotation of said head and carton relative to said element engaging the carton at least partially to unfold it, a stationary cam disposed coaxially of said suction head, and a carton-opening arm pivotally carried by said suction head and having a cam follower engaging said cam surface for operation of said arm into engagement with the carton to move it from a partially unfolded state to at least a fully opened position.

References Cited in the file of this patent

UNITED STATES PATENTS

| | | |
|---|---|---|
| 1,158,211 | Holly | Oct. 26, 1915 |
| 1,211,757 | Reifsnyder | Jan. 9, 1917 |
| 1,252,460 | Linderme | Jan. 8, 1918 |
| 1,275,759 | Russel | Aug. 13, 1918 |
| 1,486,598 | Milmoe | Mar. 11, 1924 |
| 1,797,692 | Moritz | Mar. 24, 1931 |
| 1,806,391 | Fitchett | May 19, 1931 |
| 1,869,750 | Isselhardt | Aug. 2, 1932 |
| 1,873,059 | Smith et al. | Aug. 23, 1932 |
| 1,877,892 | Kluge et al. | Sept. 20, 1932 |
| 1,969,946 | Root | Aug. 14, 1934 |
| 2,016,814 | Ferguson | Oct. 8, 1935 |
| 2,051,483 | Jones | Aug. 18, 1936 |
| 2,059,416 | Thom | Nov. 3, 1936 |
| 2,082,565 | Benoit | June 1, 1937 |
| 2,109,537 | Kimball | Mar. 1, 1938 |
| 2,110,980 | Swift | Mar. 15, 1938 |
| 2,134,418 | Rose | Oct. 25, 1938 |
| 2,176,122 | Chapman | Oct. 17, 1939 |
| 2,282,278 | Wysong | May 5, 1942 |
| 2,289,820 | Ardell | July 14, 1942 |
| 2,293,498 | First et al. | Aug. 18, 1942 |
| 2,318,208 | First et al. | May 4, 1943 |
| 2,340,536 | Joplin | Feb. 1, 1944 |
| 2,356,120 | Slightman | Aug. 15, 1944 |
| 2,399,934 | Monroe | May 7, 1946 |
| 2,443,182 | Carter | June 15, 1948 |
| 2,461,277 | Hohl | Feb. 8, 1949 |
| 2,540,162 | Bowersock | Feb. 6, 1951 |
| 2,627,804 | Bone | Feb. 10, 1953 |